United States Patent
DeGennaro et al.

(10) Patent No.: US 11,431,698 B2
(45) Date of Patent: Aug. 30, 2022

(54) PARTNER INTEGRATION NETWORK

(71) Applicant: NBA Properties, Inc., New York, NY (US)

(72) Inventors: Kenneth DeGennaro, Oakland, NJ (US); Hector Arguelles Menendez, New York, NY (US); Christopher Quansah Benyarko, Weehawken, NJ (US); Edwin Edem Akrong, Brooklyn, NY (US)

(73) Assignee: NBA Properties, Inc., New York, NY (US)

( * ) Notice: Subject to any disclaimer, the term of this patent is extended or adjusted under 35 U.S.C. 154(b) by 512 days.

(21) Appl. No.: 16/177,196

(22) Filed: Oct. 31, 2018

(65) Prior Publication Data
US 2020/0137041 A1  Apr. 30, 2020

(51) Int. Cl.
*H04L 9/40* (2022.01)

(52) U.S. Cl.
CPC ...... *H04L 63/0807* (2013.01); *H04L 63/0861* (2013.01); *H04L 63/102* (2013.01); *H04L 2463/082* (2013.01); *H04L 2463/101* (2013.01)

(58) Field of Classification Search
CPC ............ H04L 63/0807; H04L 63/0861; H04L 63/102; H04L 2463/082; H04L 2463/101; H04N 21/2541; H04N 21/254; H04N 21/25875; H04N 21/2816; H04N 21/6334; H04N 21/222
USPC ......................................................... 726/1
See application file for complete search history.

(56) References Cited

U.S. PATENT DOCUMENTS

| | | | |
|---|---|---|---|
| 5,875,296 A * | 2/1999 | Shi | H04L 63/168 726/5 |
| 7,231,450 B1 * | 6/2007 | Clifford | H04L 63/08 709/225 |
| 7,437,769 B2 | 10/2008 | Meyerson | |
| 7,895,445 B1 * | 2/2011 | Albanese | G06F 21/6218 713/172 |

(Continued)

FOREIGN PATENT DOCUMENTS

WO  2014089345 A1  6/2014
WO  2014201101 A1  12/2014

OTHER PUBLICATIONS

International Search Report, PCT/US2019/058928 dated Feb. 25, 2020.

(Continued)

*Primary Examiner* — Kambiz Zand
*Assistant Examiner* — Mahabub S Ahmed
(74) *Attorney, Agent, or Firm* — Vinson & Elkins L.L.P.

(57) ABSTRACT

Systems and methods are provided for a media provider to allow a user to access media objects with a third-party partner that authenticates the user and authorizes the user to access certain media objects. The media provider offers access to media objects, such as video content or audio content. The partner, through a relationship with the media provider, similarly offers access to the media provider's media objects, for example, as a service or benefit to the partner's customers or users. In particular, a partner integration server mediates user authentication and authorization by the partner. The partner integration server also allows the media provider to easily and flexibly to add and integrate additional partners.

25 Claims, 11 Drawing Sheets

(56) References Cited

U.S. PATENT DOCUMENTS

| | | | | |
|---|---|---|---|---|
| 8,196,180 B2* | 6/2012 | Keeler | H04W 12/088 | 711/149 |
| 8,826,347 B1* | 9/2014 | Earle | H04N 21/454 | 725/115 |
| 8,869,207 B1* | 10/2014 | Earle | H04N 21/25891 | 725/38 |
| 8,931,041 B1* | 1/2015 | Banerjee | G06F 21/335 | 726/1 |
| 9,071,569 B1* | 6/2015 | Jacobs | H04L 63/102 | |
| 9,154,949 B1* | 10/2015 | Bertz | H04L 63/0853 | |
| 9,331,983 B2* | 5/2016 | Zhou | H04L 67/327 | |
| 9,392,309 B2* | 7/2016 | Jin | H04N 21/8352 | |
| 9,838,869 B1* | 12/2017 | Bye | H04L 63/102 | |
| 10,405,017 B1* | 9/2019 | Roka | H04N 21/25841 | |
| 10,742,659 B1* | 8/2020 | Roka | H04L 63/0884 | |
| 2001/0000358 A1* | 4/2001 | Isomichi | G06F 21/41 | 726/13 |
| 2002/0087661 A1* | 7/2002 | Matichuk | H04N 5/765 | 709/224 |
| 2003/0233329 A1* | 12/2003 | Laraki | H04L 29/1233 | 705/52 |
| 2005/0086683 A1* | 4/2005 | Meyerson | H04N 21/6125 | 348/E7.071 |
| 2008/0092181 A1* | 4/2008 | Britt | H04N 21/4788 | 348/E7.071 |
| 2008/0320543 A1* | 12/2008 | Wang | H04N 21/8355 | 725/131 |
| 2009/0047000 A1 | 2/2009 | Walikis | G06F 16/4387 | 386/292 |
| 2009/0100465 A1* | 4/2009 | Kulakowski | H04N 21/2355 | 725/39 |
| 2009/0113532 A1* | 4/2009 | Lapidous | H04L 9/32 | 709/219 |
| 2009/0165034 A1* | 6/2009 | Chaudhry | H04N 21/47214 | 725/39 |
| 2009/0165088 A1* | 6/2009 | Chaudhry | H04N 21/6581 | 709/229 |
| 2009/0235347 A1* | 9/2009 | Syed | H04L 9/3213 | 726/10 |
| 2009/0271399 A1* | 10/2009 | Chaudhry | H04N 21/2393 | 707/999.005 |
| 2010/0138900 A1* | 6/2010 | Peterka | H04L 65/4076 | 726/4 |
| 2010/0138903 A1* | 6/2010 | Medvinsky | H04L 63/0807 | 726/6 |
| 2011/0263196 A1* | 10/2011 | Saros | H04L 67/20 | 455/3.01 |
| 2011/0302598 A1* | 12/2011 | Lundgren | H04N 21/44218 | 725/25 |
| 2011/0321079 A1* | 12/2011 | Lankford | H04N 21/47202 | 726/5 |
| 2012/0079578 A1* | 3/2012 | Dachiraju | H04N 21/8549 | 726/26 |
| 2012/0311564 A1* | 12/2012 | Khalid | G06F 9/45508 | 718/1 |
| 2013/0232561 A1* | 9/2013 | Gupta | H04W 12/069 | 726/5 |
| 2013/0266138 A1* | 10/2013 | Mantri | H04L 63/06 | 380/44 |
| 2013/0347025 A1* | 12/2013 | Prakash | H04N 21/25875 | 725/25 |
| 2014/0122342 A1* | 5/2014 | Rajakarunanayake | H04L 9/007 | 705/59 |
| 2014/0157298 A1* | 6/2014 | Murphy | H04N 21/64 | 725/110 |
| 2014/0196128 A1* | 7/2014 | Finster | H04N 21/2393 | 726/5 |
| 2014/0282986 A1* | 9/2014 | Leung | H04L 41/0896 | 726/9 |
| 2014/0289530 A1* | 9/2014 | De Waal | H04L 67/10 | 709/204 |
| 2015/0039517 A1* | 2/2015 | Liberty | G06Q 20/4012 | 705/67 |
| 2015/0046939 A1* | 2/2015 | Oliver | H04N 21/25875 | 725/27 |
| 2015/0150038 A1* | 5/2015 | Hao | H04N 21/8455 | 725/31 |
| 2015/0245099 A1* | 8/2015 | Perez | H04N 21/4312 | 725/44 |
| 2015/0304851 A1* | 10/2015 | Chen | H04L 63/0853 | 713/172 |
| 2015/0365403 A1* | 12/2015 | Counterman | H04L 63/107 | 726/9 |
| 2015/0382037 A1* | 12/2015 | Huang | H04N 21/6131 | 725/28 |
| 2016/0013985 A1* | 1/2016 | Reddy | H04L 63/0892 | 726/4 |
| 2016/0065555 A1* | 3/2016 | Branden | H04L 63/0807 | 726/7 |
| 2016/0105698 A1* | 4/2016 | Tang | H04N 21/4627 | 725/25 |
| 2016/0134616 A1* | 5/2016 | Koushik | H04L 63/0807 | 726/9 |
| 2016/0142743 A1* | 5/2016 | Nielsen | H04N 21/2358 | 725/54 |
| 2016/0149956 A1* | 5/2016 | Birnbaum | H04L 63/20 | 726/1 |
| 2016/0337368 A1* | 11/2016 | D'Egidio | H04L 63/102 | |
| 2017/0019410 A1* | 1/2017 | Reilly | G06F 21/31 | |
| 2017/0147795 A1* | 5/2017 | Sardesai | G06F 21/41 | |
| 2017/0195335 A1* | 7/2017 | Kurian | H04L 67/06 | |
| 2017/0214693 A1* | 7/2017 | Bao | H04L 63/0807 | |
| 2017/0316185 A1* | 11/2017 | Park | H04L 63/0428 | |
| 2017/0359346 A1* | 12/2017 | Parab | H04L 65/4084 | |
| 2018/0026984 A1* | 1/2018 | Maker | H04L 67/10 | 726/4 |
| 2018/0063564 A1* | 3/2018 | Phatak | H04N 21/4753 | |
| 2018/0083980 A1* | 3/2018 | Bond | G06F 21/604 | |
| 2018/0367536 A1* | 12/2018 | Bhargava | G06Q 10/10 | |
| 2019/0281055 A1* | 9/2019 | Bhargava | H04L 63/0892 | |
| 2020/0099675 A1* | 3/2020 | Mardiks Rappaport | H04L 63/0807 | |
| 2020/0106778 A1* | 4/2020 | Park | H04L 65/4084 | |
| 2020/0107058 A1* | 4/2020 | Huang | H04N 21/2402 | |

OTHER PUBLICATIONS

Written Opinion of the International Searching Authority, PCT/US2019/058928 dated Feb. 25, 2020.

* cited by examiner

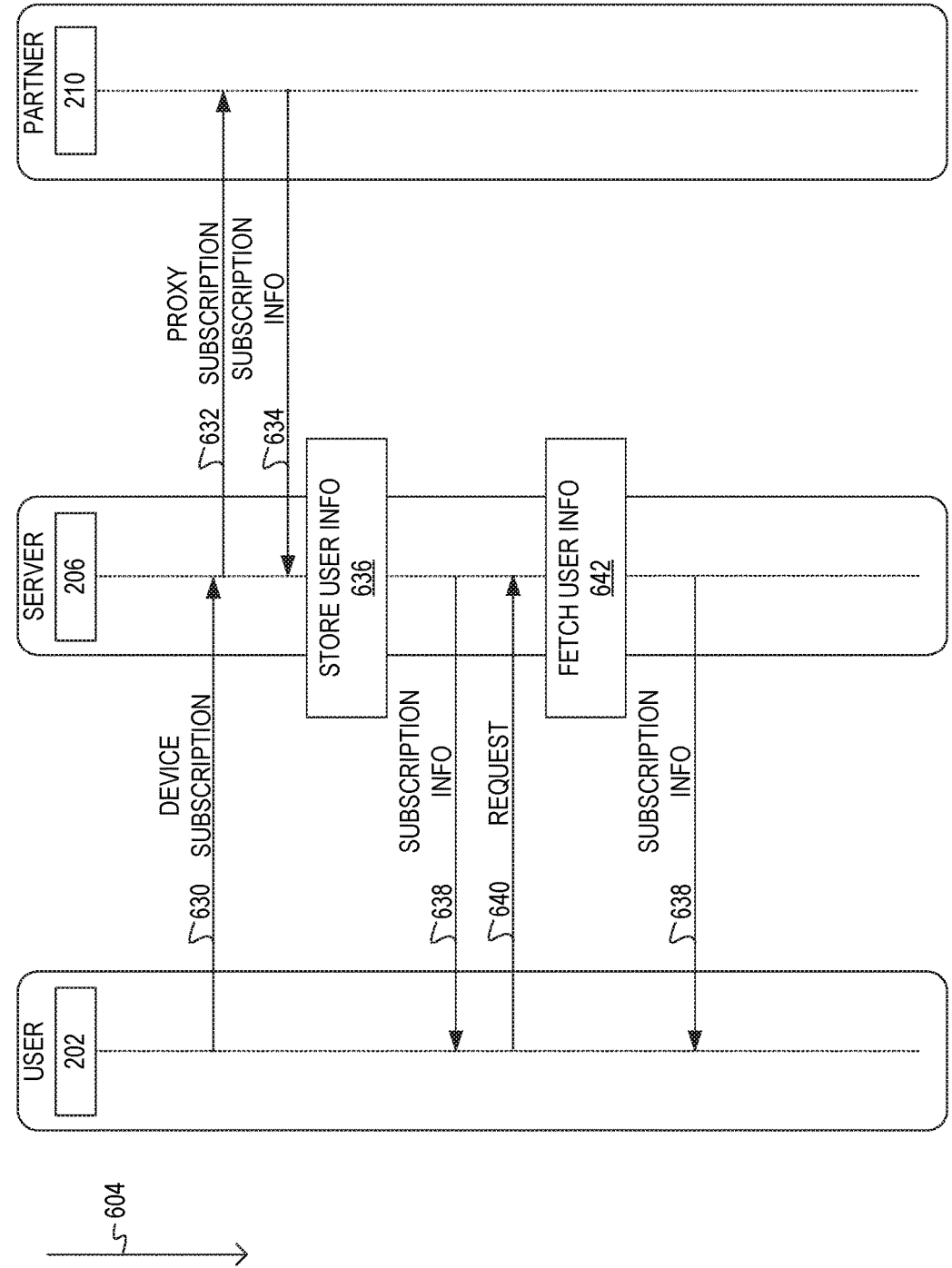

PARTNER INTEGRATION NETWORK

BACKGROUND

Field of the Disclosure

The present disclosure relates generally to communication networks and, more particularly, to partner integration for media networks.

Description of the Related Art

Modern media networks can involve multiple parties in allowing users to access media content. The party providing the media content to the user, the content or media provider, may have a business relationship with other parties, or partners, to allow access to media content to particular users, typically because the user is a customer or has some other relationship with the partner. In these networks, the content or media provider and the partner collectively must identify the user and confirm that the user has rights to access the media content. These networks use a process called "authentication" to validate the identity of users seeking to access media content, such as subscription-based content with restricted access rights. For example, a content provider may operate a media network to enable public access to a repository of media objects. The content provider may be a broadcast entity, a television provider, an Internet service, or another type of media provider that offers the media objects, such as digital video content, to authenticated users. In addition to authenticating the user's identity, a content provider may also validate that the user has the specific rights, e.g., digital rights or valid subscription, to access the particular media object being requested. Confirming the user's rights to access the media object, or some collection of media objects, is sometimes referred to as "authorization."

For example, for authentication in the digital television environment, standard authentication solutions have been widely used to authenticate users and unlock television media objects on a variety of different devices, platforms, and systems. Typically, the standard authentication solution assumes that the sources and platforms for delivering paid content, such as television media objects, are known in advance and do not change very often, and that a relatively small number of media providers and networks are intended for integration as partners into the authentication solution. However, standard solutions for authentication of digital media objects may not provide sufficient flexibility to engage different kinds of business partners and business arrangements that might be associated with providing access to media objects.

SUMMARY

In one aspect, a first method is disclosed for authenticating users to access media content. The first method may include receiving, from a media access client executing at a user device associated with a user, a first request at a partner integration server to access a media server providing access to media objects in a media repository. Responsive to the first request, the first method may further include identifying at least one partner, including a first partner, from a plurality of partners associated with the partner integration server. In the first method, each of the plurality of partners may be onboarded for operation with the partner integration server. The first method may further include retrieving first partner information associated with the first partner, the first partner information indicative of an authentication method usable with the first partner to authenticate the user. Based on the first request, the first method may include using the authentication method to authenticate the user. When the authentication method successfully authenticates the user, the first method may further include receiving an authorization token from the first partner, the authorization token usable by the media access client to access the media objects via the media server, and forwarding the authorization token to the media access client.

In any of the disclosed embodiments, the first method may further include, prior to retrieving the first partner information, receiving, from the media access client, a selection of the first partner.

In any of the disclosed embodiments of the first method the first request includes information associated with the user and indicative of at least one of: a geolocation of the user device; a carrier network for the user device; a brand or model of the user device; and a network address associated with the first partner.

In any of the disclosed embodiments, the first method may further include, based on the first partner information, sending configuration information to the user device, the configuration information enabled for configuring a user interface displayed on the user device.

In any of the disclosed embodiments of the first method, the user device may be a mobile device. In any of the disclosed embodiments of the first method, the mobile device may be enabled for wireless networking. In any of the disclosed embodiments of the first method, the mobile device may be enabled for telephone service.

In any of the disclosed embodiments, the first method may further include receiving a subscription query from the media access client, the subscription query including the authorization token, and forwarding the subscription query to the first partner. Responsive to the subscription query to the first partner, the first method may include receiving subscription information from the first partner, the subscription information specifying access rights to the media objects provided to the user, and forwarding the subscription information to the media access client. In the first method, the media access client may be authorized to access the media objects specified by the subscription information.

In any of the disclosed embodiments, the first method may further include accessing the first partner information usable to onboard the first partner for operation with the partner integration server, including modifying at least some of the first partner information, and storing the first partner information in an administrative repository accessible to the partner integration server.

In any of the disclosed embodiments of the first method, the first partner information may specify at least one of: filtration criteria for identifying the first partner using the first request, a type of partner selected from session partner, transaction partner, and discount partner, an authentication method for authenticating the user, an internal subscription or an external subscription to the media objects, and configuration information for the media access client when the first partner is identified.

In another aspect, a server is disclosed for use in a media network. The server may include a processor and memory media accessible to the processor storing instructions executable by the processor. In the server, the media network may include a media server that provides access to media objects stored in a media repository, and the instructions may include instructions for receiving a first request from a user device operated by a user. In the server, the first request may be for access to the media network and the first request may include wireless network information for a wireless network providing network service to the user device. In the server, based on the first request, the instructions may further include instructions for identifying a wireless network provider associated with the wireless network, sending partner information associated with the wireless network provider to the user device, sending a second request to the wireless network provider to authenticate the user. In the server, the second request may include authentication information for the user from the first request. In the server, when the wireless network provider authenticates the user responsive to the second request, the instructions may include instructions for receiving an authorization token from the wireless network provider. In the server, the authorization token may enable the user device to access at least some of the media objects. In the server, the instructions may include instructions for sending the authorization token to the user device, and receiving a third request from the user device for subscription information associated with the authorization token. In the server, the subscription information may specify access rights to at least some of the media objects, including a first media object. In the server, the instructions may include instructions for querying the wireless network provider for the subscription information, and sending the subscription information to the user device. In the server, the user device may be enabled to use the subscription information to replay the first media object.

In any of the disclosed embodiments, the server may further include instructions for, responsive to receiving the subscription information, storing the subscription information. In any of the disclosed embodiments of the server, storing the subscription information may further include instructions for storing the subscription information at an admin repository accessible to the server, while the subscription information may be indexed to the user.

In any of the disclosed embodiments of the server, sending the second request to the wireless network provider may further include selecting an authentication method associated with the second request. In the server, the authentication method may be specified in partner information for the first partner. In any of the disclosed embodiments of the server, the authentication method may be selected from at least one of: no login method, a basic login method, a token authentication method, a two-factor authentication (2FA) method, and a biometric authentication method. In any of the disclosed embodiments of the server, the token authentication method may be OAuth or SAML 2.0.

In any of the disclosed embodiments, the server may further include instructions for receiving partner information for a second wireless network provider that is not onboarded for operation with the server in the media network. Using the partner information for the second wireless network provider, the server may further include instructions for configuring the server to register the second wireless network provider with server. In the server, the second wireless network provider may be available to the server for identifying customer relationships with users.

In any of the disclosed embodiments of the server, receiving the partner information for the second wireless network provider may further include instructions for receiving the partner information via an administrative client associated with the server. In the server, the administrative client may be enabled to store the partner information to configure the second wireless network provider to operate with the server for authenticating users.

In any of the disclosed embodiments of the server the server may store the partner information at an admin repository accessible to the server. In the server, the partner information may be indexed to the second wireless network provider and may correspond to a partner protocol for authentication by the second wireless network provider.

In yet another aspect, a media partner integration system is disclosed. The media partner integration system may include a partner integration server, a media access platform providing access to a media repository, and the media repository storing media objects. In the media partner integration system, the partner integration server may be enabled to receive a first request from a user of a user device to access the media objects. In the media partner integration system, the user device may be enabled to provide, to the partner integration server, at least one filtration criteria associated with the user, the filtration criteria selected from at least one of: a geolocation identifier, a carrier network, a location coordinate, a network address, and a device type. In the media partner integration system, in response to the first request, the partner integration server may be enabled to send a second request to authenticate and to authorize the user with at least one partner server, including a first partner server and the partner integration server may select the first partner server based on the filtration criteria.

In any of the disclosed embodiments of the media partner integration system, the partner integration server may be enabled to receive a selection of the first partner server from the user device.

In any of the disclosed embodiments of the media partner integration system, the partner integration server may be enabled to receive an authorization response to the second request from the first partner server, the authorization response including a partner subscription identifier, and match the partner subscription identifier to a second subscription identifier associated with the media access platform.

In any of the disclosed embodiments of the media partner integration system, the partner integration server may be enabled to store configuration data respectively for each of the partner servers, including the first partner server. In the media partner integration system, the configuration data may identify an authentication protocol respectively associated with each of the partner servers. In the media partner integration system, the partner integration server may further be enabled to select a first authentication protocol associated with the first partner server.

In any of the disclosed embodiments of the media partner integration system, the configuration data may further include selection criteria for identifying the respective partner server, and a partner subscription identifier, while the partner configuration server may be enabled to receive requests from an administrative client to modify the configuration data.

In any of the disclosed embodiments of the media partner integration system, the configuration data may further include a partner server identifier associated with the first authentication protocol. In any of the disclosed embodiments of the media partner integration system, the media objects may further include at least one of: audio objects, video objects, and text objects. In any of the disclosed embodiments of the media partner integration system, at least one of the media objects may be associated with a live event. In any of the disclosed embodiments of the media partner integration system, at least one of the media objects may be associated with a past event. In any of the disclosed embodiments of the media partner integration system, at least one of the media objects may be associated with a sports event. In any of the disclosed embodiments of the media partner integration system, the first authentication protocol may be selected from at least one of: a basic login protocol, a token-based authentication protocol, a two-factor authentication protocol, and a biometric authentication protocol.

BRIEF DESCRIPTION OF THE DRAWINGS

For a more complete understanding of the present invention and its features and advantages, reference is now made to the following description, taken in conjunction with the accompanying drawings, in which:

FIG. 6B is a protocol timeline of selected elements of an embodiment of a transaction partner authentication;

DESCRIPTION

Figure 1:
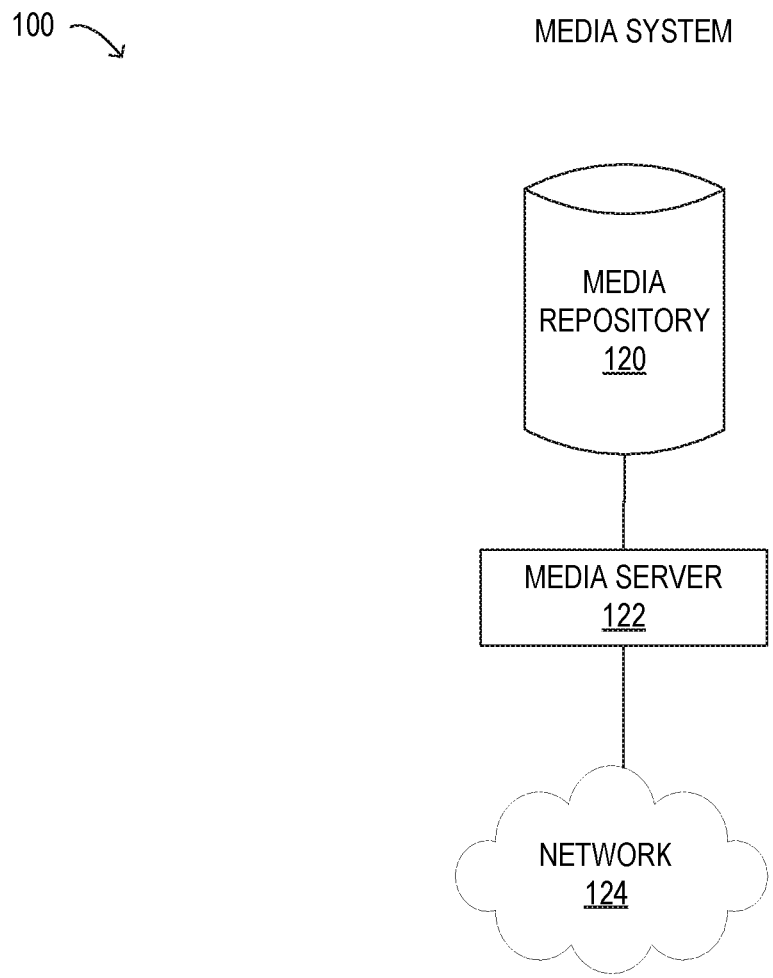
FIG. 1 is a block diagram of selected elements of an embodiment of a prior art media network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

The embodiments disclosed here relate to systems and methods for a media provider to flexibly integrate partners in a system or network providing users to access media objects. The media provider offers access to media objects, such as video content or audio content. The partner, through a relationship with the media provider, similarly offers access to the media provider's media objects. The partner may do so as a service or benefit to the partner's customers or users. Embodiments disclosed here include a partner integration server that mediates partner selection and user authentication (verifying the user's identify) and user authorization (verifying that the user has rights or permission to access the media objects) by the partner. In other embodiments disclosed here, the partner integration server has access to an administrative repository that stores configuration information regarding the partners, for example, the partner's selection or availability criteria, workflows, authentication protocols, authentication or authorization Application Programming Interface ("API") endpoints, language preferences, user interface elements, error code mappings, or subscription mappings to be used in connection with each partner. The partner integration server may access and use that configuration information to direct the system's interactions between the user or partner. In some embodiments, an administrative client allows the configuration and modification of the configuration information stored in the administrative repository for each partner. By including an additional layer between the user and the partner, comprising the partner integration server, administrative repository, and administrative client, partners can be flexibly added to the system or configured while the system is live, that is without requiring new or updated software to be distributed to the end user.

Referring now to the drawings, FIG. 1 illustrates a media system 100. As shown, media system 100 depicts modular functionality and includes a media repository 120 that stores a collection of media objects and a media server 122 that provides access to the media objects stored in media repository 122 via a network 124. For example, a media access application or player may comprise software that enables a user to access the media objects stored in media repository 120. For example, media repository 120 may be owned and operated by a media provider (not shown) that seeks to monetize access to the media objects, for example, by offering subscription or pay-per-view services to users to enable users to access the media objects. Accordingly, the media access application may perform authentication and authorization of the users to enable access to media repository 120.

The media provider may control rights to distribute media content using media server 122 and media repository 120. The media provider may be a content creator, i.e., an entity that makes the media content, for example, a television or movie production company or, for example, a band or an author. In other embodiments the media provider may have rights to distribute content created by other individuals or entities, for example a television network or other media services company. In some embodiments the media provider is a sports league or association and provides media content related to its sporting events. The media content provided using media server 122 may be any type of media. For example, the media content may be audio, video, text, graphics, pictures, virtual reality, augmented reality or any combination thereof. In some embodiments, the media content is of a live event, i.e., audio of a speech or audio and video of a concert. In other embodiments, the media content is not live and instead is pre-recorded. In some embodiments, the media content is audio/video of a sporting event, provided live, as the sporting event is occurring, or recorded from an earlier sporting event.

Additionally, when the media access application and media system 100 support the involvement of third parties, such as partners of the media provider that wish to sponsor or enable users to access media system 100, the media access application may perform partner authentication to validate that a user has an account or is registered with a partner. Accordingly, the partner authentication may include, or may represent a component of, a standard authentication solution that is capable of authenticating users for access to the media objects stored in media repository 120. For example, the standard partner authentication may rely upon various types of information and algorithms to implement an authentication process for users, including user-provided information.

In this manner, when users have a business relationship, such as a registered account, with a partner, the partner authentication may enable authentication of users via the partner. However, because the standard partner authentication is incorporated into the media access application, such as by compilation in one example, any change to the partners or the partner relationship may result in malfunction of the media access application until the partner changes have been updated in the code used to generate the media access application, such as by developing a new software version of the media access application, which is not desirable. Furthermore, the interface between the standard partner authentication and the partners may be limited to certain given authentication standards, and may not support the actual authentication already used by the partner and the partner systems, which is also not desirable.

Figure 2A:
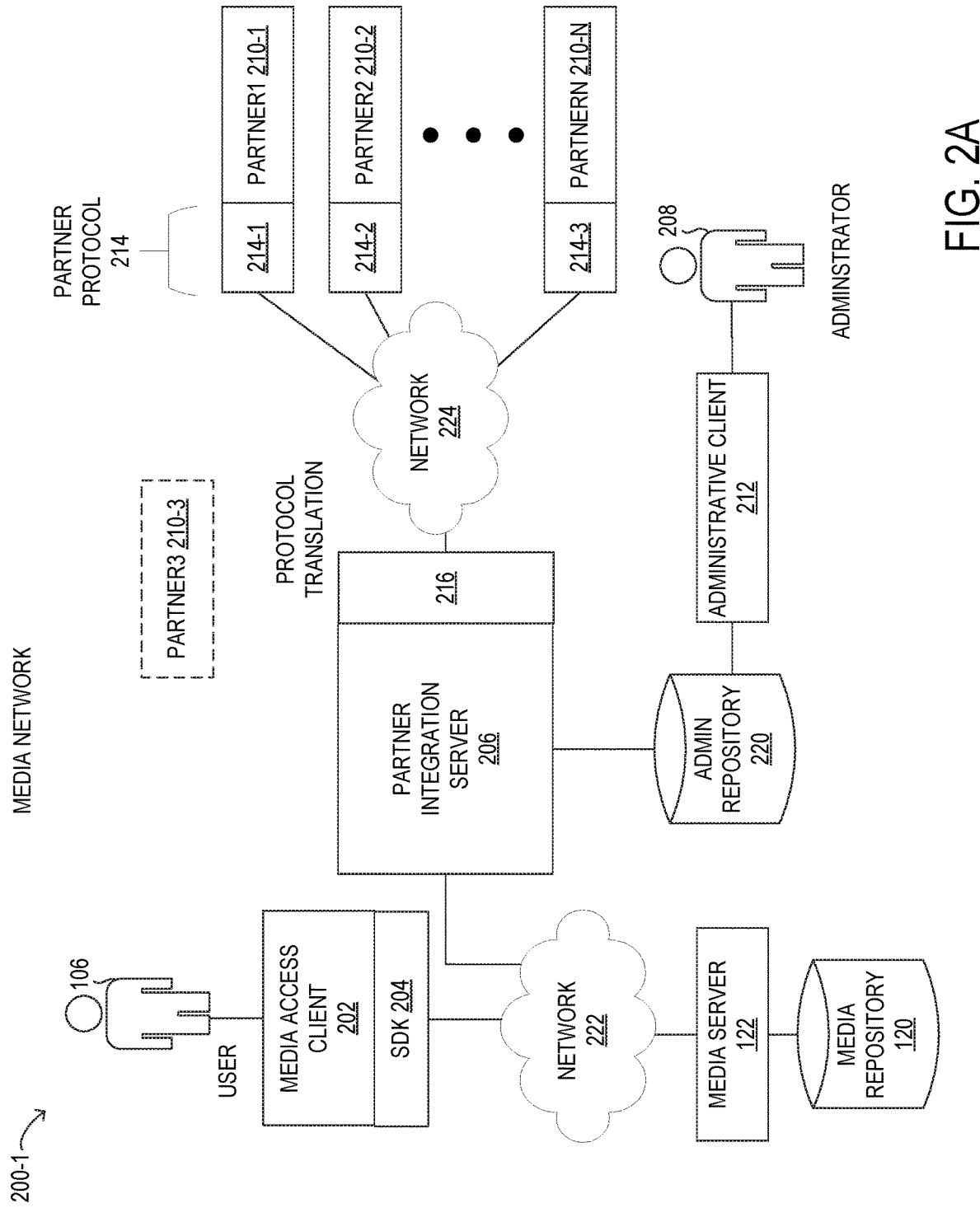
FIG. 2A is a block diagram of selected elements of an embodiment of a media network with media network authentication with partner onboarding.

Referring now to FIG. 2A, a media network 200-1 is shown that incorporates media network authentication with partner onboarding, as disclosed herein. In FIG. 2A, media server 122 and media repository 120 represent the same elements as described previously with respect to FIG. 1. However, media network 200-1 includes a media access client 202 that is enabled for media network authentication with partner integration, as disclosed herein. Specifically, media network 200-1 includes a partner integration server 206 that may be accessed by media access client 202 using a software development kit ("SDK") 204 used to implement media access client 202. SDK 204 may support various operations for partner integration to enable media access client 202 to access partner integration server 206, for example over network 222.

Also shown in FIG. 2A is an administrative client 212 that may enable an administrator 208 to access partner integration server 206, with direct access depicted. It will be understood that administrative client 212 may also access partner integration server 206 using a network, such as networks 222 or 224, for example. For example, administrative client 212 may represent a plurality of web pages provided by partner integration server 206 that can be used to access admin repository 220. Administrator 208 may be provided functionality by using administrative client 212 to perform partner onboarding without having to re-compile or change the compiled code of media access client 202, which is substantially different from how media system 100 was described being accessed with respect to FIG. 1, using standard authentication software. Specifically, administrative client 212 and partner integration server 206 may use an admin repository 220 as a data store for configuring authentication processes. For example, admin repository 220 may be a database that records various authentication information that is indexed to individual users 106 and to individual partners 210. In various implementations, admin repository 220 may be integrated with partner integration server 206.

Also shown in FIG. 2A are up to N number of partners 210 having access to partner integration server 206, where N is any desired number. Each of partners 210 in FIG. 2A may represent, or may include, a partner system, such as a server executing code or software, that performs authentication of users 202, and that is integrated with partner integration server 206.

Additionally, in FIG. 2A, each partner 210 is shown having a partner protocol 214 that may be unique to the respective partner 210. For example, partner protocol 214-1 may be unique to or uniquely associated with partner 210-1, partner protocol 214-2 may be unique to or uniquely associated with partner 210-2, and partner protocol 214-3 may be unique to or uniquely associated with partner 210-3. Each partner 210 may be configured with a customized arrangement to authenticate user 106 to access the media objects in media repository 120, such as based on a commercial relationship between user 106 and partner 210 that is external to media network 200-1. The commercial relationship between user 106 and partner 210 may be for certain services, or may represent a membership (or an account) by user 106 with partner 210. Accordingly, partner 210 may represent various different kinds of business entities and is not limited to any specific examples presented herein for descriptive purposes.

Figure 2B:
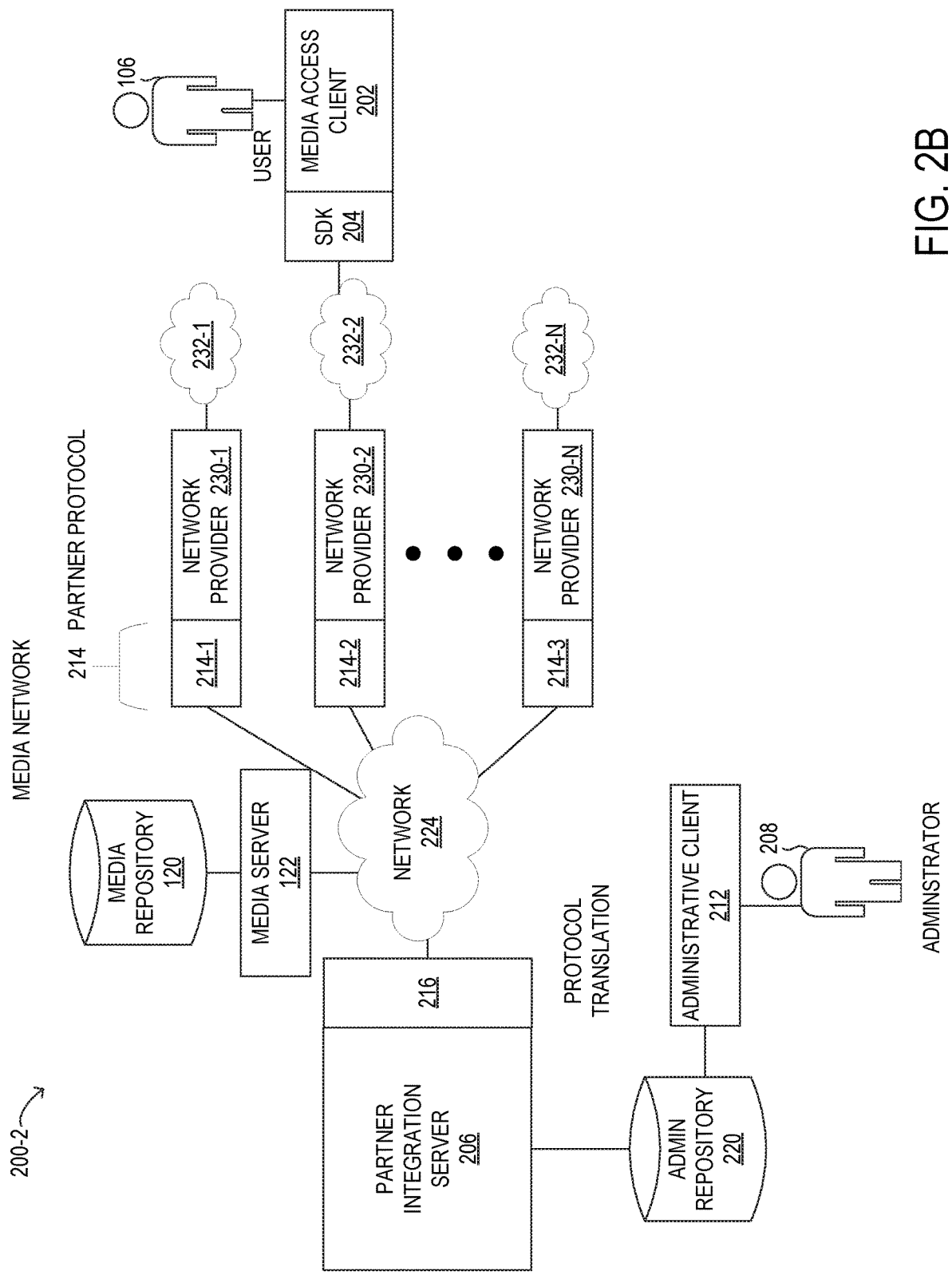
FIG. 2B is a block diagram of selected elements of an embodiment of a media network with media network authentication with partner onboarding.

In one example, partner 210 may operate a network or may be a network provider, such as an Internet provider (see also FIG. 2B). Thus, the network services offered by partner 210 may be associated with a particular location, region, state, nation, or marketplace. Specifically, when partner 210 is a wireless network provider in a given area (such as serviced by network 222 or a portion thereof), user 106 may be a subscriber of partner 210 for wireless network services, such as cellular telephone and associated digital communication services, such that network requests issued by user 106 using media access client 202 are processed through partner 210. In some embodiments, partner 210 may be associated with a franchise chain of retail locations, such as hotels, restaurants, bars, coffee shops, or particular retail stores, having wireless networks accessible by users 106. Thus, when partner 210 is associated with a network, and users 106 access partner integration server 206 via the network, partner 210 may provide network information from the network to enable partner integration server 206 to identify partner 210, for example.

Also shown in FIG. 2A is partner3 210-3, without any direct network connections in media network 200-1. As shown, partner3 210-3 may represent a type of partner that does not operate a network and that does not have any direct functionality in media network 200-1. Instead, partner3 210-3 may have some kind of relationship with user 106, such as having provided user 106 with an offer code to enable user 106 to access media repository 120. Thus, partner integration server 206 may be enabled to support partner3 210-3 without performing authentication of user 106 with partner3 210-3. For example, partner3 210-3 may be identified for user 106 based on user input of an identifier associated with partner3 210-3 (the offer code) or explicit user selection of partner3 210-3, for example, from a list of potential partner options.

As shown in FIG. 2A, partners 210 may access partner integration server 206 using partner protocol 214 via network 224. As shown, partner integration server 206 may incorporate protocol translation 216 that may be enabled to translate or map various information provided using partner protocol 214 into information that is used or standardized by partner integration server 206. Furthermore, administrative client 212 may be enabled to allow administrator 208 to setup protocol translation 216 that is specific to a given partner protocol 214 to support onboarding of associated partner 210. For example, error code values returned by partner protocol 214 may be translated or mapped by protocol translation 216 into an standard error code value that is internally used by partner integration server 206. In this manner, partner integration server 206 may support any kind of partner 210 having any kind of partner protocol 214 for authentication purposes, without being dependent on a given implementation of either partner integration server 206 or media access client 202, which is desirable for maintenance and operation of media network 200-1.

As shown in FIG. 2A, networks 222 and 224 may represent various types of wireless or wired or combination wired/wireless networks. As noted previously, when media access client 202 is executed on a mobile device (see also FIG. 4) by user 106, user 106 may have an account for wireless services to use the mobile device on network 222. In various embodiments, networks 222 and 224 may include or provide access to a public network, such as the Internet. In some embodiments, networks 222 and 224 may represent the same network. Networks 222 and 224 may include, for example, a local area network ("LAN") or wide area network ("WAN"). Networks 222 and 224 may support various types of connections to various devices, as desired. Networks 222 and 224 may be, for example, packet switched networks, such as Ethernet, and may use, for example, the transmission control protocol/Internet protocol ("TCP/IP") suite of communication protocols.

Referring now to FIG. 2B, a media network 200-2 is shown that incorporates media network authentication with partner onboarding, as disclosed herein. In FIG. 2B, various like numbered elements represent the same elements as described previously with respect to FIG. 2A. Media network 200-2 may represent a special case of media network 200-2 in particular embodiments. Instead of network 222 representing a front end client access network as in media network 200-1, in media network 200-2, media access client 202 is a member (or a subscriber) of network 232, which is associated with a corresponding network provider 230 that represents partner 210. Specifically, in media network 200-2, partners 210 are represented by network providers 230 who operate a respective network 232, as described previously. Accordingly, various functionality described herein for partners 210 may be equivalent or substantially equivalent for network providers 230, in particular with respect to access and use of partner integration server 206. Thus, a network provider 230-1 may be associated with a network 232-1, a network provider 230-2 may be associated with a network 232-2, and so on, up to a network provider 230-N being associated with a network 232-N. Furthermore, in media network 200-2, media access client 202 may access partner integration server 206 and media repository 120/ media server 122 via networks 232 and 224.

As shown in FIG. 2B, networks 232 may represent various types of wireless or wired or combination wired/ wireless networks. In FIG. 2B, when media access client 202 is executed on a mobile device (see also FIG. 4) by user 106, user 106 may have an account with network provider 230 for wireless services to use the mobile device on network 232, associated with network provider 230. In various embodiments, network 232 may include or may provide access to a public network, such as the Internet. In given implementations, network 232 may be a carrier network, such as a cellular telephone network, while media access client 202 is executed on a device that is a subscriber of the carrier network.

Referring again to FIG. 2A, as will be described in further detail herein, in media network 200, partner integration server 206 may perform authentication of users 106 who operate media access client 202 by authenticating user 106 using internal user information, such as stored in admin repository 220, or by using the internal user information to authenticate user 106 at partner 210 on behalf of user 106 (also referred to as "proxy authentication" where partner integration server 206 is a proxy for user 106). In some implementations, partner integration server 206 may enable authentication of users 106 directly with partner 210, without partner integration server 206 first authenticating user 106.

Furthermore, in media network 200, partner integration server 206 may authenticate user 106 who operates media access client 202 for accessing specific media content, such as certain collections of media content. The media content that user 106 is authorized to access may be based on the relationship (not shown) of user 106 with partner 210, such as based on an offer for a particular subscription to the media content in media repository 120. For example, certain partner relationships with partner 210 may authorize user 106 to access audio content, while other partner relationships with partner 210 may authorize user 106 to access video content, image content, virtual reality content, or augmented reality content. Other types of partner relationships with partner 210 may authorize user 106 for various types of subscriptions or offers to content or media objects, including coupons, discounts, per-view access, access periods of time, among others.

In media network 200, partner integration server 206 and partners 210 may comprise software executing under an operating system (OS) on a computing platform commonly termed a "server" (see also FIGS. 3 and 5), which may be a physical server or a virtual server, such as a virtual OS executing on a virtual machine.

Partner Onboarding

In media network 200, one advantage of partner integration server 206 in media network 200 is the ability to onboard new partners, which refers to the introduction or addition of new partners 210 to operate with partner integration server 206, without modifying source code (i.e., software) associated with either partner integration server 206 or media access client 202. As disclosed herein, onboarding of new partners may occur after a partner entity associated with partner 210 has executed an agreement with the media provider of media network 200, such as governing the terms of access to media server 122/media repository 120 that partner 210 may offer to subscribers of partner 210, thereby enabling the subscribers to become users 106. As disclosed herein, partner onboarding may represent an automated technical solution to implement the contract or agreement between the media provider of media network 200 and the partner entity associated with partner 210.

To enable the addition of new partners 210 without modification of underlying source code of partner integration server 206 or media access client 202, partner integration server 206 may specify a set of standards, embodied by software development kit (SDK) 204 in FIG. 2A, that can used by media access client 202 to access partner integration server 206. Thus, SDK 204 may represent a set of Application Programming Interface ("API") functions that media access client 202 may use to perform authentication methods for user 106 with partner 210, as described in further detail herein. The API functions used for SDK 204 may provide a programmatic interface in the form of defined functions or procedures that may represent an abstraction of an underlying software implementation of the functions and procedures. Thus, the API functions used for SDK 204 may result in exposure of a selected collection of actions or functions to media access client 202 that are used by partner integration server 206. SDK 204 may also include the structure and content of the function calls exchanged between media access client 202 and partner integration server 206, such as in the form of a protocol (see also FIGS. 6A, 6B, 6C).

For example, during an onboarding process, administrator 208 may operate administrative client 212, for example, to configure protocol translation 216 to operate with partner protocol 214. In this manner, access to partner integration server 206 is not limited to a particular protocol, such as an authentication standard, such that a partner protocol 214 that may already be implemented by partner 210 may be used without modification, and thus, without disruption of existing technology used by partner 210, which is desirable. It is noted that administrator 208 may be associated with partner integration server 206, or administrator 208 may be associated with partner 210 and may be given access rights by partner integration server 206 to use administrative client 212, such as using a remote network connection.

As shown in media network 200, administrative client 212 may be used by administrator 208 to onboard a new partner 210 for operation with partner integration server 206. The administrative services enabled by administrative client 212 may allow for adding and managing partners 210 for use with media network 200. The administrative services may be provided in the form of a web application that administrator 208 can use. In some embodiments, the web application comprising administrative client 212 may comprise a series of user interface screens, as part of a graphical user interface, for viewing and entering data associated with the partners. The administrative services enabled by administrative client 212 may allow for partners 210 to be added or deleted. When a partner 210 is added, partner integration server 206 may create an electronic record for partner 210, such as in admin repository 220. The electronic record may include, as described below, configuration data for partner 210. The electronic record may be stored at admin repository 212, for example, in a database, flat file, or other electronic file and associated with or indexed to partner 210. Various types of databases may be used with admin repository, including relational databases (e.g., an SQL database) and non-relational (e.g., a NoSQL database).

In some embodiments of media network 200, filtration criteria for identifying partner 210 may be configured and stored in the configuration data for partner 210. The filtration criteria may include any information included in requests received from a user device, for example, information included in hypertext transfer protocol (HTTP) headers of such requests. In various embodiments, partners 210 may be associated with, for example, particular media access platforms, media providers, user locations, carrier networks, network addresses, Internet protocol (IP) addresses or ranges of IP addresses, types of devices, user affiliations, or other characteristics of user 106 or a device associated with user 106. IP addresses are unique strings of numbers separated by periods that identify each computer or device connected to an IP network, such as the Internet. Current protocol versions for IP addresses include IPv4 (a 32-bit address scheme) and IPv6 (a 128-bit address scheme). A range of IP addresses for which partner 210 may be accessible over a public network may also be designated in the filtration criteria. User location information may include country, state, or metropolitan statistical area identifiers derived or obtained from IP address-based geolocation databases or providers, commonly termed geo or geolocation. User location information may also include, for example, latitude-longitude coordinates derived or obtained from global positioning satellite (GPS) information. User affiliations may include, for example, a user's membership in an organization or enrollment in or subscription to the services of business or other organization. Carrier networks are proprietary networks belonging to telecommunications companies. Carrier networks may be designated with combinations of mobile country codes (MCC) and mobile network code (MNC).

An association between user characteristics or user device characteristics and partners 210 may allow partners 210 to be filtered or selected in appropriate circumstances to identify a suitable partner 210. For example, partner 210 may be operational in particular countries, and accordingly, partner integration server 206 may be configured to match user 106 with partner 210 when the initial information from user 106 indicates the matching countries.

Combinations of filtration criteria are also possible, for example, a partner may be associated with a particular country and carrier network. Filtering mechanisms include combinations of geolocation, carrier network and device information filters, for example, using the following combined search terms: {"US", "Digicel", "Samsung Android 10.3.2"}. The carrier network may include a carrier name and a mobile country code and a mobile network code. Combinations of geolocation and IP address may also be used, for example, using the following combined search terms: {"US", "255.255.255.0"}.

The filtration criteria may include groups of various characteristics, for example, geo groups, carrier groups, device groups, or IP address groups. In this context, groups are collections of potential filtering criteria, for example, a collection or group of countries, a collection or group of carriers, a collection or group of device types, or a collection or group of IP addresses or IP address ranges. For example, certain geographic regions (e.g., the countries) where partner 210 operates may be designated in the filtration criteria using geo groups. A carrier group may also be designated in the filtration criteria, for example, using a name and a mobile country code and a mobile network code for one or more carriers. Certain devices that users 106 may use to operate media access client 202 and that are supported by partner 210, such as particular brands or models of mobile phones, may also be designated in the filtration criteria.

As noted above, in media network 200, certain subscription offers from partner 210 may also be configured and stored in the configuration data for partner 210. The subscription offers from partner 210 may be mapped to or associated with the subscriptions offered by media network 200, and the mapping may also be stored in the configuration data for each individual partner 210. In this manner, each partner 210 may be given wide flexibility in offering customized and tailored media subscriptions to users 106. An expiration date for the subscription offers or for the mapping may also be configured and stored in the configuration data for partner 210. In various embodiments, an expiration date is a date after which the subscription or mapping is no longer valid. In other words, after the expiration date, the subscription would no longer be authorized and would no longer be accessible to media access client 202, for example.

Also in media network 200, a partner type may be configured and stored in the configuration data for partner 210. For example, consistent with the types of partners 210 described above, allowing different workflows with respect to authentication and authorization, partner 210 may be configured as a SESSION PARTNER, a TRANSACTION PARTNER, or a DISCOUNT PARTNER, based on an agreement or contract between the partner entity associated with partner 210 and the media provider of media network 200. As other types of partner relationships and corresponding workflows emerge from future market activity, new partner types may be defined as used in addition to the three exemplary partner types described herein.

In media network 200, certain logos, banners, and other graphical or text elements associated with partner 210 may be configured and stored in the configuration data for partner 210. The graphical or text elements may be incorporated into a graphical user interface of media access client 202 in association with partner 210. Similarly, the configuration data may include localization preferences for partner 210. The configuration data may be stored in admin repository 220 and provided to media access client 202 from partner integration server 206. Such a customization of media access client 202 may be desirable for branding media access client 202 according to a market identity of partner 210. Because the configuration data may be stored with at least one of partner integration server 206 and admin repository 220, the customized display elements for partner 210 may be updated during operation of media access client 202, including without delay when a change is made with at least one of partner integration server 206 and admin repository 220, and without involving redevelopment and rerelease of a new version of media access client 202.

In media network 200, certain error codes for partner 210 may also be configured and stored in the configuration data for partner 210. The partner integration server 206 may have and use standard error codes, for example, errors codes for indicating that a user could not be authenticated or that a user is not authorized to access certain content. A partner 210 may choose to include customized text or graphical elements for display to the user in association with those error codes. A partner 210 may also choose to map its own error codes to the standard error codes employed by the partner integration server 206. That information may also be stored with the configuration data for partner 210.

The above described configuration data for partner 210 may be stored in administrative repository 220. The configuration information relating to, for example, the partner's 210 particular authentication protocols or language or localization preferences may be used by the partner integration server 206 to control the presentation and workflow of the system when used in connection any particular partner 210. Because this configuration information may be stored and accessed by a separate layer from the media access client 202 or media server 122, it may be flexibly configured for each partner without having to modify the operation or programming of the media access client 202 or media server 122.

Mobile devices used by user 106 to execute and operate media access client 202 may include a mobile phone, a smart phone, a tablet, a portable computer, a laptop, a media player, among others. Other user devices used by user 106 to execute and operate media access client 202 in some embodiments may include a game console, a streaming player, a streaming device, a set top box, a television, a smart television, a watch, among others. User inputs to the user device by user 106 may be provided using a touchscreen, a keyboard, a mouse, a pointing device, gestures, audio input, speech, voice commands, among others. The user device may provide video playback through a screen, display, monitor, or television, audio playback may be provided through speakers or headphones, and display of text, graphics, or pictures may be provided on a screen, display, monitor, or television. In some embodiments, media content may be accessed and consumed at, essentially, the same time, and in other embodiments, the media content may be stored, for example, locally on the user device, for later consumption.

In some embodiments, administrative client 212 may comprise software that allows an administrator to add and configure partners included in the network. The administrative client may be, for example, a client application or in a web browser. The administrative client runs on a computing device, for example, a mobile phone, smart phone, tablet, computer, laptop, game console, streaming player, streaming device, set top box, television, or smart television.

In some embodiments, administrative client 212 may allow an administrator to make certain partners available or unavailable. When an administrator selects to publish, or make available, a partner, the partner 210 may be selected or filtered for through media network 200 as described above. Conversely, when a partner 210 is unpublished, the partner may no longer be selected through the media network 200. The administrative client may also allow for scheduling of partner publishing and unpublishing at certain dates or times.

Client Access and Partner Selection

In particular embodiments, the media provider may operate partner integration server 206 and media server 122, and may provide media access client 202 to enable users 106 to access media server 122. Media access client 202 may accordingly comprise software that allows user 106 to access media objects stored in media repository 120 via media server 122. Media access client 202 may allow the play out or display of the media objects on a user device, such as a mobile device (see FIG. 4). Accordingly, media access client 202 may include a graphical user interface enabling user interaction by user 106 through inputs and outputs provided via the user device.

Additionally, media access client 202 may be customized to specific features or functionality associated with partner 210. For example, media access client 202 may be customized for partner 210 after partner integration server 206 determines that user 106 is associated with partner 210. The determination of partner 210 for user 106 is also referred to as 'filtration' herein.

When user 106 connects to partner integration server 206 by opening and operating media access client 202, partner integration server 206 may receive certain initial information associated with user 106 or a device associated with user 106. The initial information received by partner integration server 206 from media access client 202 on behalf of user 106 may specify a geolocation, latitude and longitude or other GPS data, a network carrier, a device type, a network or IP address, among other information, as described above. Based on the initial information, partner integration server 206 may filter or select one or more matching partners using the stored filtration criteria associated with the partners described above.

When one matching partner (from partners 210) is found, media access client 202 may be configured by partner integration server 206 according to configuration information stored for the matching partner in admin repository 220. In some embodiments, user 106 may first be given the option via media access client 202 to select the one matching partner before continuing with the media access workflows. If more than one matching partner is found, user 106 may be given a choice via media access client 202 to select one partner among potential partners to use for media access. The partner 210 selected by user 106 is then used for the media access workflows described below. If no matching partners are found, then the user may still be able to access media objects through authentication and authorization as provided by the media provider, for example, through the media server 122 or the partner integration server 206, without involving partner 210.

The characteristics or criteria, such as in the initial information received by partner integration server 206 from media access client 202, may be stored by partner integration server 206 at admin repository 220. For example, a record of metadata associated with user 106 may be created and stored at admin repository 220, for access by administrative client 212 or partner integration server 206, such as for the filtering or selection of appropriate partners 210.

Subscriptions

While operating media network 200 for commercial purposes, the media provider may offer or provide different subscriptions, allowing access by users 106 via media access client 202 to various collections or groupings of media objects stored in media repository 120. For example, a first subscription may be for audio content media objects, while a second subscription may be for video content media objects. Other subscriptions could be for virtual reality or augmented reality media objects. Still other subscriptions may be provided by partner 210, such as for live event media objects, pre-recorded media objects, television program media objects, or movie media objects, among others. In still other embodiments, certain subscriptions may be associated with media objects featuring a particular actor or actress, media objects for games of a particular type, media objects associated with particular sports or sports leagues, media objects associated with particular teams or groupings of teams. In further embodiments, the subscriptions may be associated with a genre of media objects (e.g., comedies, dramas, or classical music), or a time period associated with media objects. It is noted that subscriptions may also be unlimited with regard to one or more access criteria, such as a subscription to all media objects in a certain category offered by media network 200.

In certain embodiments, partners 210 may similarly provide or may enable access to a subscription for respective users 106 associated with partner 210. Partners 210 may be allowed to offer customized subscriptions to users 106, such as by agreeing to a corresponding contract with the media provider of media network 200 that governs subscription access that partner 210 may provide to users 106. The customized subscription may offer access to different existing collections or existing offers for the media objects provided by media network 200. Furthermore, the subscription offered by partner 210 may be mapped to or associated with one or more subscriptions offered directly by the media provider to media network 200, such as subscriptions available to the general public.

Partner Types

In media network 200, partners 210 may handle user data in different manners and utilize different work flows to support or enable users 106 to receive different types of subscriptions. Specifically, three partner types are described below in further detail below, a SESSION PARTNER, a TRANSACTION PARTNER, and a DISCOUNT PARTNER. In general any of these three partner types may use any of the authentication protocols discussed below. The partners vary in terms of the user's 106 persistence with the system and whether the partner integration server 206 associates the user 106 with an account. For the SESSION PARTNER, user 106 follows a two-step process every time they access the system, first logging in with the partner and then checking for subscriptions. A user account for partner integration server 206 not required. For the TRANSACTION PARTNER, an account is associated with the user at partner integration server 206. After the user logs into the partner 210 the first time, logins are no longer required on subsequent accesses, because sufficient information about the user is stored in the partner integration layer, i.e., the partner integration server 206 and admin repository 210. For the DISCOUNT PARTNER, the login process is similar to that of the SESSION PARTNER, and the user 106 is entitled to purchase a subscription or access media objects after successfully logging in through the partner 210. More detailed and specific protocol examples indicative of different partner types are described below with respect to FIGS. 6A, 6B, and 6C.

User Authentication by Partners

In various embodiments, media network 200 and partner integration server 206 support user authentication. A variety of authentication protocols may be supported by media network 200, such that different authentication protocols may be used by different partners 210, allowing media network 200 to be operated with the different protocols. Thus, media network 200 may operate with authentication protocols selected by or chosen by partner 210, instead of defining only specific authentication protocols that are operable with media network 200 and partner integration server 206. Authentication protocols that may be supported include, for example, a login with a name and a password, a token-based authentication (such as OAuth or OAuth 2.0 or Security Assertion Markup Language (SAML) or SAML 2.0 authentication), and a two-factor authentication (2FA), among other possible authentication protocols.

In other embodiments of media network 200, certain partners 210 may not utilize user authentication in certain instances. In such cases, media network 200 and partner integration server 206 may be operable with no authentication of user 106. Instead, partner 210, chosen by the filtering criteria by partner integration server 206, may enable user 106 to access media server 122 without authentication of the user's identity, such as with transaction partner authentication 601 (see FIG. 6B).

In a basic login authentication protocol, user 106 may provide a user identifier and a password. The user identifier may be an email address for user 106 or another identifier assigned to or chosen by user 106. The password is a text string, known by user 106 and partner 210, associated with the user identifier. In an authentication process using the basic login authentication protocol, user 106 may be queried by media access client 202, for example, for the user identifier and password. Media access client 202 may send the user identifier and password to partner integration server 206. In some embodiments, the user identifier and password may be sent using encryption, such using hypertext transfer protocol secure (HTTPS). Partner integration server 206 server may pass identifying information for user 106 to partner 210 through a method specified during partner onboarding (e.g., a particular HTTP/S request method (GET, POST, PUT, DELETE) to a particular universal resource locator (URL)), which are also known as API endpoints. Partner 210 may process the user identifier and password, and may provide one of two responses, either a success response or an error response, back to partner integration server 206. Partner 210 may use a database or flat file or other records to determine whether the password provided by user 106 matches a stored password associated with the user identifier. The success response indicates that user 106 was successfully authenticated by partner 210 because the password provided matched the stored password for the user identifier. The error response indicates that the authentication was not successful for user 106 and may include an error code that indicates the nature of the failure or error in authentication at partner 210. If user 106 is successfully authenticated, partner integration server 206 may then query partner 210 to determine whether user 106 is authorized or entitled to a valid subscription. If user 106 is authorized or entitled to a valid subscription, partner 210 may return a subscription token to partner integration server 206.

In a token-based authentication protocol, a user's account information may be used by an external service without exposing the password. An example of a token-based authentication is the Open Authorization (OAuth) protocol, such as promulgated by the Internet Engineering Task Force (IETF) OAuth Working Group. In token-based authentication, the process is similar to a basic login in that the user is queried for a user identifier and a password, such as by media access client 202. The user's user identifier and password may be sent to partner integration server 206, and then sent by partner integration server 206 to a first endpoint designated for partner 210 during the onboarding process. For example, a particular URL with a particular HTTP/S request method may be specified as the first endpoint using administrative client 212. A response from the first endpoint, as specified for partner 210, may provide an authorization code back to partner integration server 206. In other embodiments, when using OAuth or other token based approaches such as SAML, user 106 may be connected directly to a login service that is hosted by partner 210, such that user 106 actually logs in directly with partner 210. The authorization code may then be provided to a second endpoint designated for partner 210 during the onboarding process. After receiving an authorization code that is confirmed, the second endpoint may provide a response to partner integration server 206 that includes an access token to partner integration server 206. With a valid access token in place, partner integration server 206 may query partner 210 whether user 106 is authorized or entitled with a valid subscription. When user 106 is authorized or entitled, partner 210 may return a subscription token to partner integration server 206, which can be forwarded to media access client 202 to enable user 106 to access media server 122.

In a two-factor authentication (2FA) protocol, user 106 is authenticated based on a combination of two factors, for example, including both a first factor based on a device that user 106 user possesses (e.g., a mobile phone or a smartcard) and a second factor that is known to user 106 (e.g., an access token or a password). In a simple example of 2FA, user 106 can access media server 122 by receiving an access token sent to the user's personal phone number, usually in the form of a short-message service (SMS) message to a mobile phone of user 106. In this case, physical possession of the mobile phone when the access token is received is a second factor completely independent of a password known to user 106, and so, provides enhanced security for both media network 200 and user 106. When a smartcard is used, a corresponding physical device (i.e., the smartcard) is inserted into a reader. Then, a numeric value, such as an identifier, associated with the smartcard is matched with personal information for user 106, such as a personal identification number (PIN). When using 2FA during onboarding, partner 210 may select a third-party provider, for example Authy Inc. (authy.com), or may specify endpoints for a partner-selected provider. In some embodiments, the 2FA provider may be able to automatically detect the country code and phone number of user 106 when user 106 accesses the login query. When specifying a non-standard provider of 2FA, the API endpoints of the non-standard provider (e.g., a universal resource locator (URL), a hypertext transfer protocol (HTTP) method), are provided to administrative client 212. In this manner, the non-standard provider can send the 2FA access token to the user's phone number and verify the one-time password provided by the user. When the 2FA endpoint returns a success response, the 2FA access token was correctly received and user 106 is successfully authenticated. When the 2FA endpoint returns an error response, the authentication was not successful and may include an error code that indicates the nature of the failure or error in authentication at partner 210. When user 106 is successfully authenticated, partner integration server 206 will then query partner 210 whether user 106 is authorized or entitled with a valid subscription. When user 106 is authorized or entitled with a valid subscription, partner 210 will return a subscription token to partner integration server 206.

During partner onboarding, the authentication protocol for use by partner integration server 206 with a particular partner 210 may be specified, whether basic login, token-based authentication, 2FA, no login, or some other form of authentication. Along with specification of the selected authentication protocol, the endpoints associated with the selected authentication protocol may also be provided to partner integration server 206, such as using administrative client 212.

In addition to basic login, token-based authentication, 2FA, no login, as described above, additional forms of authentication that may be used include Security Assertion Markup 2.0 Language (SAML 2.0) and biometric authentication, such as with a biometric device that is included with the mobile device of user 106 that executes media access client 202.

Figure 3:
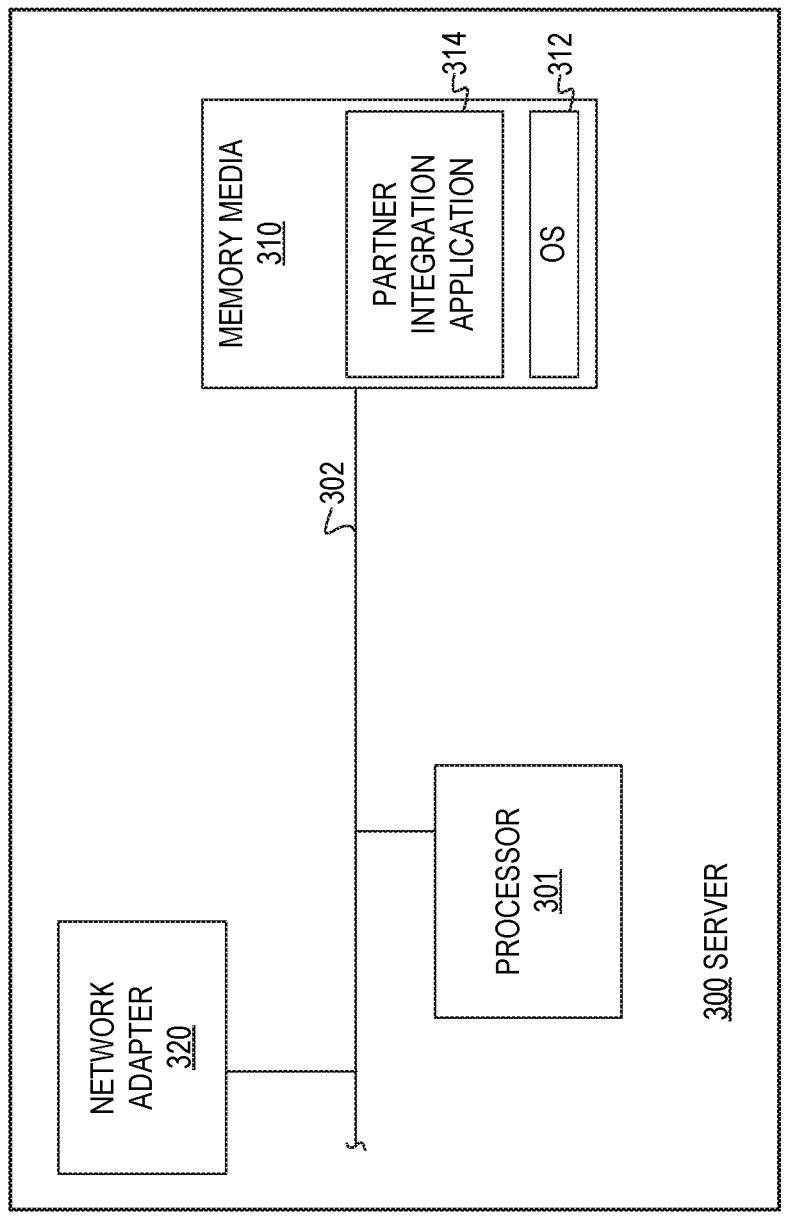
FIG. 3 is a block diagram of selected elements of an embodiment of a server.

Referring now to FIG. 3, a block diagram showing selected elements of an embodiment of a server 300 is illustrated. Server 300 may represent a general computer system that is enabled to execute a partner integration application 314, which may represent executable code associated with partner integration server 206 (see FIG. 2A). In various embodiments, server 300 may represent a computer system enabled to execute various functionality shown with respect to FIG. 2A, such as functionality associated with partner 210 or partner website 230. As depicted in FIG. 3, server 300 includes processor 301 and memory media 310, which may communicate using system bus 302. Also shown accessible via system bus 302 is network adapter 320 that may provide connectivity to a network, such as networks 222 and 224.

As shown in FIG. 3, memory media 310 may represent volatile, non-volatile, fixed, or removable media, and may be implemented using magnetic or semiconductor memory. Memory media 310 is capable of storing instructions and data. As shown, memory media 310 stores instructions (i.e., code executable by processor 301) including operating system (OS) 312 and partner integration application 314. Operating system 312 may be any of a variety of operating systems, such as a UNIX variant, LINUX, a Microsoft Windows® operating system, or a different operating system.

Figure 4:
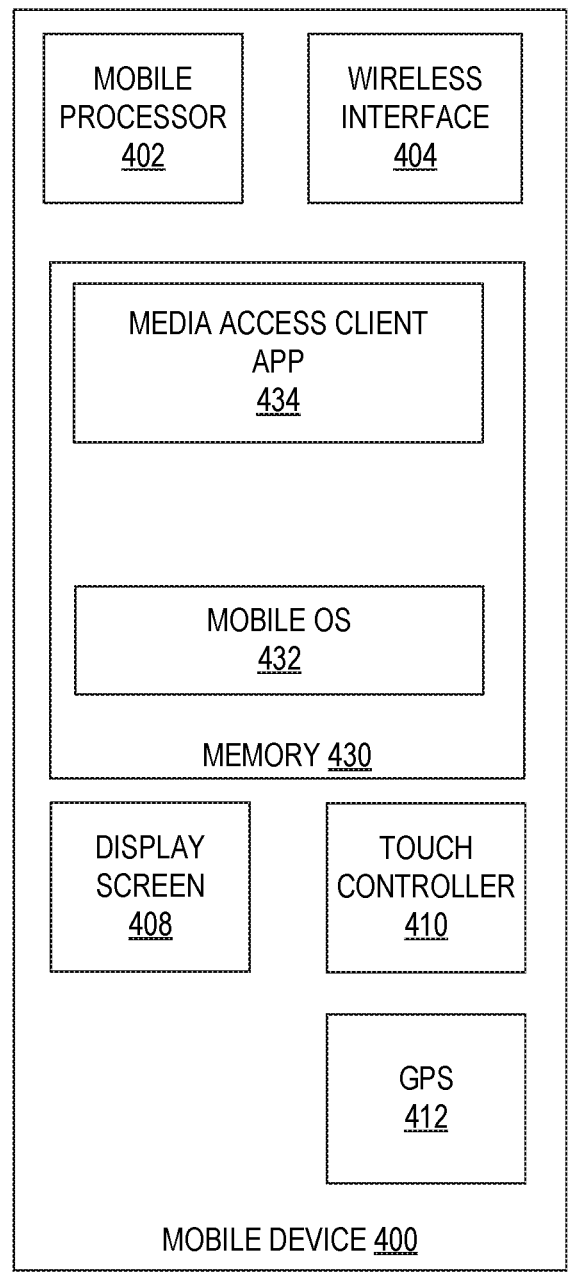
FIG. 4 is a block diagram of selected elements of an embodiment of a mobile device.

Referring now to FIG. 4, a block diagram of selected elements of an embodiment of a mobile device 400 is depicted. Mobile device 400 may represent any of a variety of mobile devices with communication and data processing capability. In various embodiments, mobile device 400 is a smart phone that may include various functionality selected from: cellular telephony, wireless networking, location sensing, motion sensing, digital imaging (i.e., a camera), touch screen operation, multimedia playback, data storage, among others. Accordingly, while certain aspects of mobile device 400 are shown in FIG. 4 for descriptive purposes, it will be understood that, in different embodiments, mobile device 400 may include different types of functionality.

As shown in FIG. 4, mobile device 400 includes a mobile processor 402 and memory 430 that may store data and instructions executable by mobile processor 402. Memory 230 is shown including mobile OS 432, which may represent a mobile operating system being executed by mobile processor 402. Examples of instances of mobile OS 432 include iOS™ (Apple Inc.) and Android™ (Google Inc.). Also, memory 430 may store media access client app 434 that is executable by mobile processor 402 to enable 4 functionality of media network 200-1, as described herein. Memory 430 may also location data for user 106 of mobile device 400, as well as other data, such as data associated with media access client 202, as described herein. The location data may be generated using mobile device 400 or may be received from partner integration server 206 or partner 210. It is noted that various apps executing on mobile device 400 may be configured to access diverse types of functionality included with mobile device 400, such as, but not limited to, imaging, communication, location-based services, gestures, touch input, motion of mobile device 400, Internet-connectivity, etc.

In FIG. 4, mobile device 400 may include at least one instance of a wireless interface 404, which may provide wireless connectivity to various types of wireless networks, such as cellular telephony networks (e.g., 3G, 4G, LTE), wireless local area networks (e.g., IEEE 802.11), wireless personal area networks (e.g., Bluetooth®), among others. Display screen 408 and touch controller 410 may operate in combination to provide a touch-screen display for output to and control by user 106. Mobile device 400 is also shown including at least one instance of a global positioning system (GPS) 412, which may be used to generate location data. It is noted that in certain embodiments, mobile device 400 may not include GPS 412, or may not rely upon GPS 412 when present, for location data. Mobile device 400 used by user 106 to execute and operate media access client 202 may represent a mobile phone, a smart phone, a tablet, a portable computer, a laptop, a media player, among others.

Figure 5:
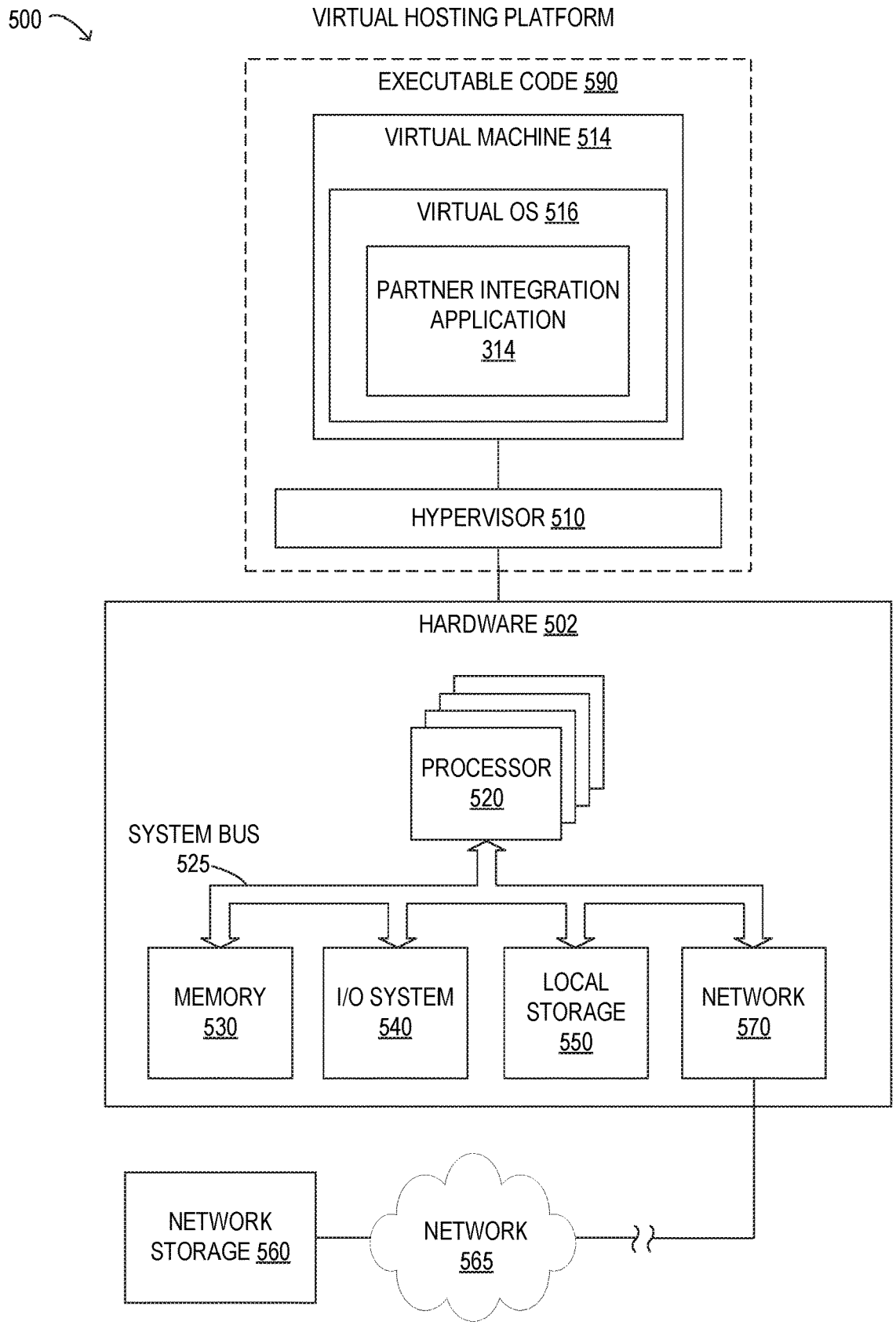
FIG. 5 is a block diagram of selected elements of an embodiment of a virtual hosting platform.

Turning now to FIG. 5, a block diagram depicting selected elements of an embodiment of a virtual hosting platform 500 for operation with media network 200-1 in FIG. 2A, in accordance with the present disclosure. As depicted in FIG. 5, virtual hosting platform 500 may represent a computer system comprising hardware 102 that is physically embodied, executable code 590 (including hypervisor 510 and at least one virtual machine 514). Also shown with virtual hosting platform 500 are external or remote elements, namely, network 565 and network storage 560.

As shown in FIG. 5, components of hardware 502 may include, but are not limited to, processor 520, which may comprise one or more processors, and system bus 525 that communicatively couples various system components to processor 520 including, for example, a memory 530, an I/O system 540, a local storage 550, and a network interface 570. System bus 525 may represent a variety of suitable types of bus structures, e.g., a memory bus, a peripheral bus, or a local bus using various bus architectures in selected embodiments.

In FIG. 5, network interface 570 may be a suitable system, apparatus, or device operable to serve as an interface between virtual hosting platform 500 and a network 565. Network interface 570 may enable virtual hosting platform 500 to communicate over network 565 using a suitable transmission protocol or standard, including, but not limited to, transmission protocols and standards discussed previously with respect to the discussion of networks 222 and 224, for example. Accordingly, network 565 may represent an instance of at least a portion of networks 222 and 224, in various embodiments. In some embodiments, network interface 570 may be communicatively coupled via network 565 to network storage 560. Network 565 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data).

As depicted in FIG. 5, processor 520 may comprise a system, device, or apparatus operable to interpret and execute program instructions and process data, and may include a microprocessor, microcontroller, digital signal processor (DSP), application specific integrated circuit (ASIC), or other digital or analog circuitry. In some embodiments, processor 520 may interpret and execute program instructions and process data stored locally (e.g., in memory 530 or in another component of hardware 502). In the same or alternative embodiments, processor 520 may interpret and execute program instructions and process data stored remotely (e.g., in network storage 560).

Also in FIG. 5, memory 530 may comprise a system, device, or apparatus operable to retain and retrieve program instructions and data for a period of time (e.g., computer-readable media). Memory 530 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated computer system, such as hardware 502, is powered down. Local storage 550 may comprise computer-readable media (e.g., hard disk drive, floppy disk drive, CD-ROM, or other type of rotating storage media, flash memory, EEPROM, or another type of solid state storage media) and may be generally operable to store instructions and data. Likewise, network storage 560 may comprise computer-readable media, as described, and may be generally operable to store instructions and data. In hardware 502, I/O system 540 may comprise a system, device, or apparatus generally operable to receive and transmit data to/from/within virtual hosting platform 500. I/O system 540 may represent, for example, a variety of communication interfaces, graphics interfaces, video interfaces, user input interfaces, and peripheral interfaces.

In FIG. 5, hypervisor 510 may comprise software or firmware generally operable to allow multiple operating systems to run on a single computer system at the same time. This operability is generally allowed via virtualization, a technique for hiding the physical characteristics of computer system resources from the way in which other systems, applications, or end users interact with those resources. Hypervisor 510 may be one of a variety of proprietary or commercially available virtualization platforms. As shown, hypervisor 510 may instantiate at least one virtual machine 514, which may represent virtual hardware that shares resources provided by hardware 502, as enabled by hypervisor 510. Accordingly, virtual machine 512 may operate in a substantially similar manner as server 300, and may execute an instance of virtual OS 516, which may be identical to OS 312 (see FIG. 3). Accordingly, virtual OS 516 may also enable execution of partner integration application 314, such as to instantiate partner integration server 206 using virtual machine 514.

Figure 6A:
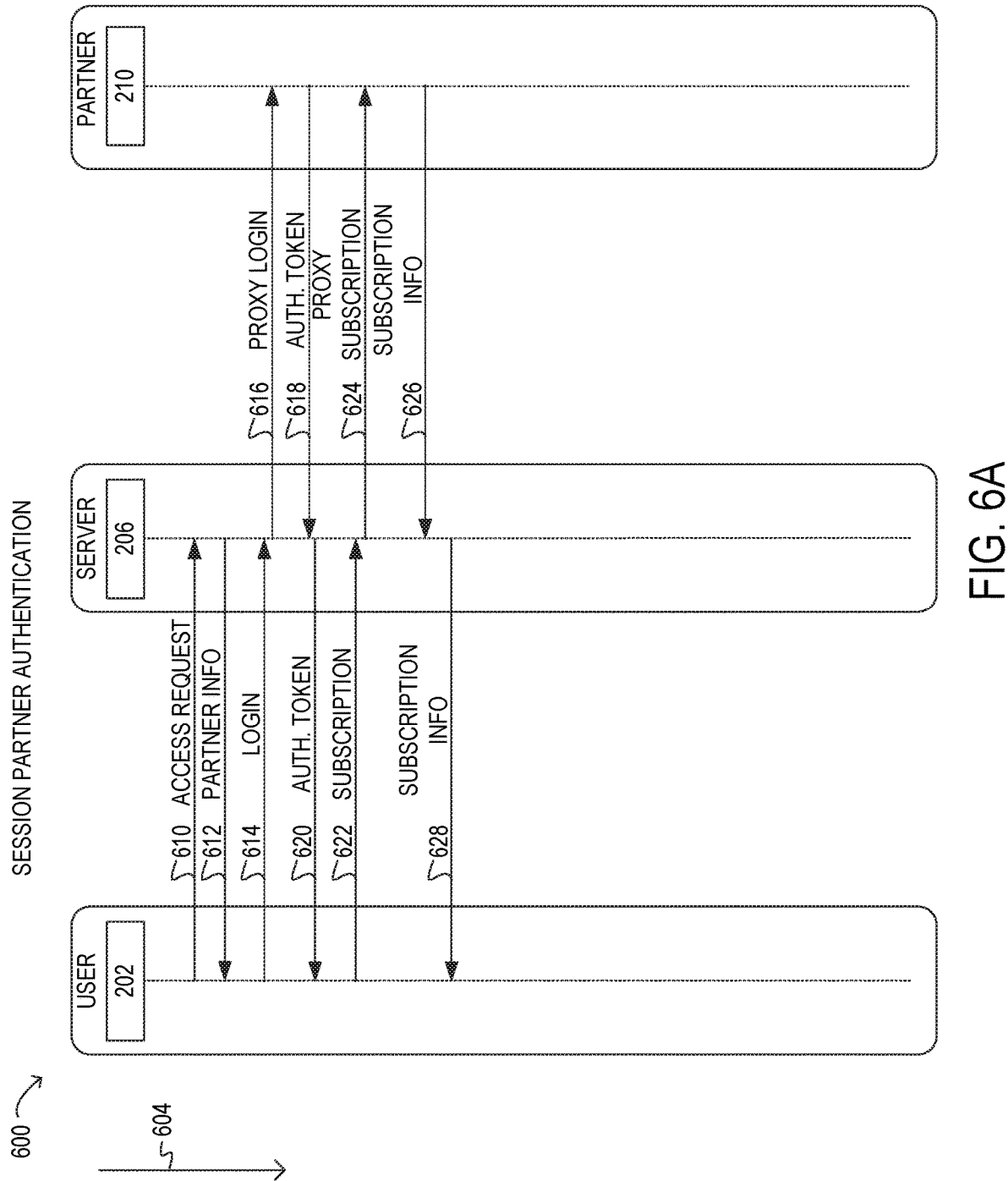
FIG. 6A is a protocol timeline of selected elements of an embodiment of a session partner authentication.
Figure 6C:
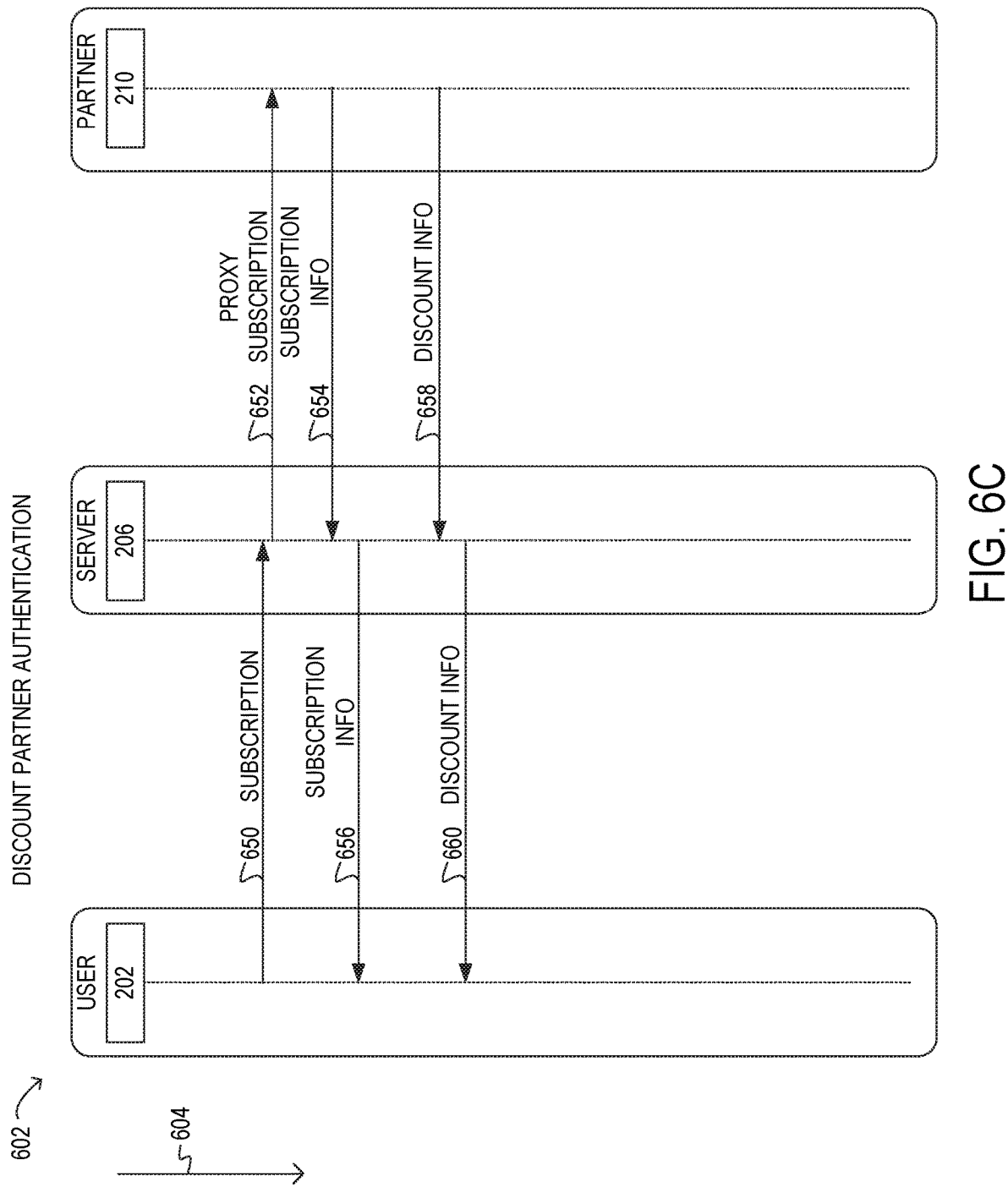
FIG. 6C is a protocol timeline of selected elements of an embodiment of a discount partner authentication.

Referring now to FIGS. 6A, 6B, and 6C, timeline protocol diagrams are illustrated to depict various authentication protocols that may be used with media network 200, as described above with respect to FIGS. 2A and 2B. The authentication protocols shown in FIGS. 6A, 6B, and 6C describe sequences of individual communications among user 106 (using media access client 202), partner integration server 206, and partner 210 (representing a partner server associated with a partner entity, for example). The respective timeline protocol diagrams shown in FIGS. 6A, 6B, and 6C follow a time sequence in the downward direction, as given by arrow 604. It is noted that FIGS. 6A, 6B, and 6C are not drawn to scale or with temporal accuracy, but are schematic illustrations used to describe a sequence and content of protocol communications.

In media network 200, users 106 associated with partner 210 that is a SESSION PARTNER may follow a two-step authentication and authorization process every time users 106 access media network 200 using media access client 202. Because partner 210 that is a SESSION PARTNER is accessed each time users 106 login for authentication at partner 210, users 106 for a SESSION PARTNER may have an account, or otherwise may be able to be authenticated and authorized, by partner 210, but may not have an account stored in admin repository 220, such as an account accessible to partner integration server 206 for the media provider.

In FIG. 6A, the user may send an access request 610 to partner integration server 206 for access to a media network. In operation of media network 200 with a SESSION PARTNER, user 106 requests access to media network 200, such as by launching media access client 202 on a mobile device, which generates access request 610. Access request 610 for user 106, which includes the initial information about user 106 or characteristics of the user's device or of the network used, is received by partner integration server 206. Partner integration server 206 may then perform a partner filtering process to identify partner 210 for user 106 based on the initial information. Responsive to request 610, partner integration server 206 may respond with partner info 612 and may cause a login screen to be displayed to user 106. Partner info 612 may comprise partner details to media access client 202 for partner 210 selected through the partner filtering process. The partner details may include configuration information to enable media access client 202 to be configured in a partner-specific manner, such as by using a partner banner, or by using partner-defined text on the login screen.

With a SESSION PARTNER, user 106 may then provide authentication credentials at login 614 to partner integration server 206. Responsive to login 614, partner integration server 206 may perform proxy login 616 with partner 210. User 106 may be prompted for login 614 with partner 210 on media access client 202, for example, using a specified protocol for partner 210. The user's login information is first received by partner integration server 206, which then forwards the login information to partner 210 for proxy login 616. Responsive to proxy login 616, partner integration server 206 may receive authorization token 618 from partner 210, and may, in turn, send authorization token 620 to media access client 202. If the authentication at proxy login 616 is successful, partner 210 returns authorization token 618 to partner integration server 206. The authorization token is usable by media access client 202 to access media server 122 and, more specifically, to access the media objects in media repository 120 that user 106 is subscribed to. Next, partner integration server 206 may send authorization token 620 to media access client 202. The user device (executing on media access client 202) may be enabled to use authorization token 620 to send subscription request 622 to partner integration server 206, which, in turn, sends proxy subscription request 624 to partner 210. Responsive to proxy subscription request 624, partner 210 may send subscription info 626 to partner integration server 206, which may, in turn, send subscription info 628 to media access client 202. In response to subscription request 624 to partner 210, partner 210 sends subscription information 626 back to partner integration server 206. Then, partner integration server 206 may send subscription information 628 to media access client 202, to enable media access client 202 to access media server 122 using authorization token 620. Subscription information 626 and 628 may include, or may specify, the media objects that are associated with authorization token 620 that user 106 has access to. The user may then be enabled to access media objects corresponding to subscription information 628 at media server 122 using authorization token 620. With a SESSION PARTNER, both session partner authentication 600 may be repeated every time user 106 accesses media network 200 using media access client 202.

With a SESSION PARTNER, each media subscription associated with partner 210 may have an expiration date. The expiration date may be the same for all users 106 for partner 210, because the agreement between the partner entity associated with partner 210 and the media provider of media network 200 may specify SESSION PARTNER access for all users 106 associated with partner 210. In cases where the expiration date is based on a relationship between user 106 and partner 210, partner authentication server 206 may request confirmation of access with partner 210 to confirm that the expiration date is still valid when user 106 logs in. If partner 210 acknowledges that the expiration date or access is no longer valid, user 106 may be notified that access is no longer available and may be given an option to re-authenticate. For cases when the expiration date and access are still valid, user 106 may be connected without further query using a background process. For example, if partner 210-1 has a media object, "XYZ," that expires on Mar. 30, 2022, users 106 having SESSION PARTNER access via partner 210-1 will be able to access media object "XYZ" until Mar. 30, 2022.

In operation of media network 200 with a TRANSACTION PARTNER, in FIG. 6B, transaction partner authentication 601 may be performed according to session partner authentication 600. Then, the user may send a device subscription 630 to partner integration server 206 for access to a media network. Users 106 associated with a TRANSACTION PARTNER follow a two-step authentication and authorization process the first time media network 200 is accessed, but may skip the authentication and authorization process on subsequent access attempts. Users 106 associated with a TRANSACTION PARTNER have an account with partner integration server 206 that allows partner integration server 206 to associate the user's subscriptions with user 106 for successive sessions, such as by storing commensurate information in admin repository 220.

In transaction partner authentication 601, when user 106 logs in to media network 200 using media access client 202 for the first time, a similar work flow as described above in session partner authentication 600 is performed, i.e., partner filtration, authentication, and authorization. The user device (executing on media access client 202) may be enabled to use authorization token 620 to send device subscription request 630 to partner integration server 206, which, in turn, sends proxy subscription request 632 to partner 210. Responsive to proxy subscription request 632, partner 210 may send subscription info 634 to partner integration server 206. However, when partner 210 returns subscription info 634 to partner integration server 206, partner integration server 206, at step 636, stores the user info comprising subscription details, such as by using a user's transaction identifier and a user's partner identifier for indexing purposes. In some embodiments, the transaction identifier may be the user's phone number. In step 636, partner integration server 206 may associate the user into in a database, flat file, or some other records in admin repository 220. Then, partner integration server 206 sends subscription info 638 to media access client 202. Partner integration server 206 may send subscription information 638 to media access client 202, to enable media access client 202 to access media server 122 using authorization token 620. Subscription information 634 and 638 may include, or may specify, the media objects that are associated with authorization token 620 that user 106 has access to.

When user 106 accesses media network 300 in a later session, such as by operating media access client 202 to generate a request 640 to partner integration server 206, partner integration server 206 may fetch the user info at step 642 and may use the stored user info to checks a user identifier provided by the user. Then, partner integration server 206 may send subscription information 638 again, this time without having to query partner 210, to media access client 202. Responsive to receiving subscription information 638, media access client 202 may display subscription information 638 to user 106 for corresponding selection of a media object for replay. In this manner, user 106 may not have to repeat the authentication and authorization workflow in FIG. 6A after a first completion.

For a TRANSACTION PARTNER, an expiration date of each subscription associated with partner 210 may vary for each user 106. For example, the expiration date may depend on multiple factors, such as a subscription date by user 106 for the subscription, and a number of days specifying a duration of the subscription. For example, if user 106 subscribes on Jan. 1, 2022 to a subscription that remains active for 10 days, user 106 can access the subscription until Jan. 10, 2022. It is noted that various types of subscriptions and time periods may be authenticated and authorized with partner 210 that is a TRANSACTION PARTNER.

In operation of media network 200 with a DISCOUNT PARTNER, in FIG. 6C, discount partner authentication 602 may be performed according to session partner authentication 600. Discount partner authentication 602 may be similar to session partner authentication 600. Users 106 associated with partner 210 that is a DISCOUNT PARTNER follow a two-step authentication and authorization process every time media access client 202 is used to access media server 122. User associated with a DISCOUNT PARTNER may not have an account with partner integration server 206 or media server 200. In discount partner authentication 602, when user 106 logs in to media network 200 using media access client 202 for the first time, a similar work flow as described above in session partner authentication 600 is performed, i.e., partner filtration, authentication, and authorization. The user device (executing on media access client 202) may be enabled to use authorization token 620 to send device subscription request 650 to partner integration server 206, which, in turn, sends proxy subscription request 652 to partner 210. For a DISCOUNT PARTNER, after user 106 performs the workflow as described above for discount partner authentication 602, partner 210 returns, along with subscription info 654, discount info 658 to partner integration server 206, which, in turn, sends discount info 660 to media access client 202. User 106 is then enabled to use the discount info 660 to make a corresponding purchase, such as by using media access client 202. Expiration of subscriptions with a DISCOUNT PARTNER also works similarly to that described for a SESSION PARTNER, with each subscription associated with a DISCOUNT PARTNER having an expiration date that is constant for all users 106 and may represent a time-limited offer on the market.

Figure 7:
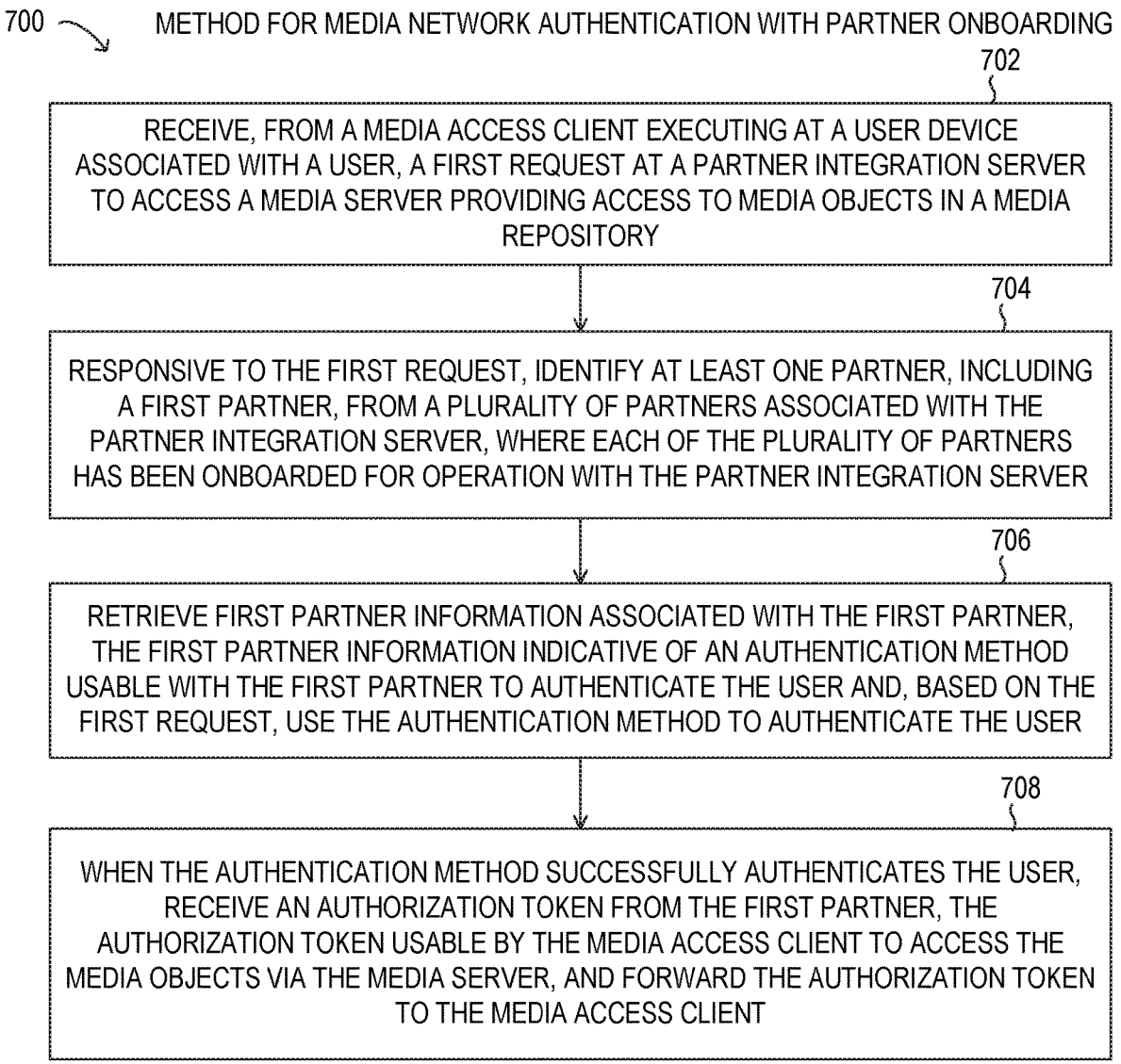
FIG. 7 is a flowchart depicting selected elements of an embodiment of a method for media network authentication with partner onboarding.

Referring now to FIG. 7, a flowchart of selected elements of an embodiment of method 700 for media network authentication with partner onboarding, as disclosed herein, is depicted. Method 700 may be performed by partner integration server 206, as described above. It is noted that certain operations described in method 700 may be optional or may be rearranged in different embodiments.

Method 700 may begin at step 702 by receiving, from a media access client executing at a user device associated with a user, a first request at a partner integration server to access a media server providing access to media objects in a media repository. At step 704, responsive to the first request, at least one partner, including a first partner, is identified from a plurality of partners associated with the partner integration server, where each of the plurality of partners has been onboarded for operation with the partner integration server. At step 706, first partner information associated with the first partner is retrieved, the first partner information indicative of an authentication method usable with the first partner to authenticate the user and, based on the first request, the authentication method is used to authenticate the user. When the authentication method successfully authenticates the user, at step 708, an authorization token is received from the first partner, the authorization token usable by the media access client to access the media objects via the media server, and the authorization token is forwarded to the media access client.

Figure 8:
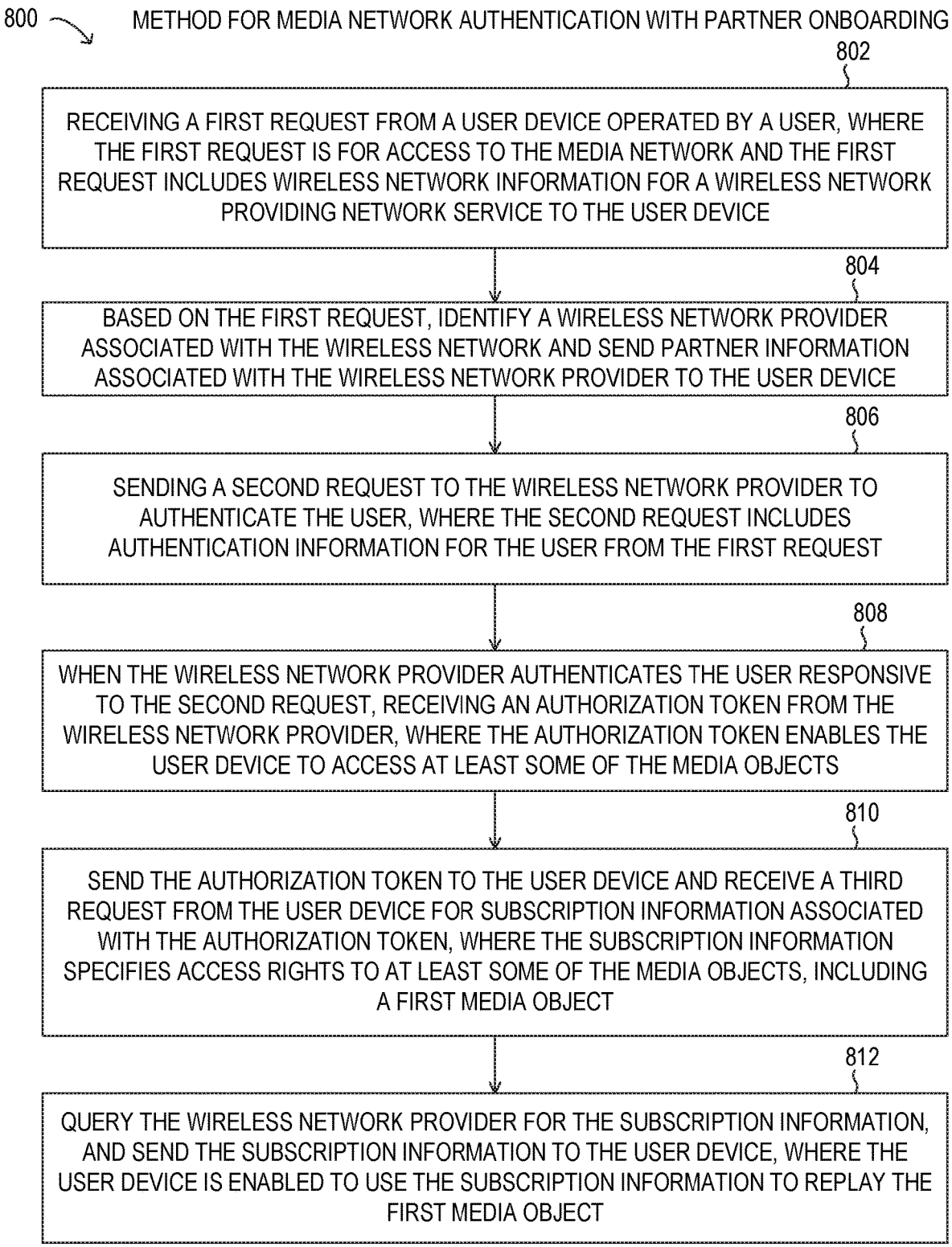
FIG. 8 is a flowchart depicting selected elements of an embodiment of a method for media network authentication with partner onboarding.

Referring now to FIG. 8, a flowchart of selected elements of an embodiment of method 800 for media network authentication with partner onboarding, as disclosed herein, is depicted. Method 800 may be performed by partner integration server 206, as described above. It is noted that certain operations described in method 800 may be optional or may be rearranged in different embodiments.

Method 800 may begin at step 802 by receiving a first request from a user device operated by a user, where the first request is for access to the media network and the first request includes wireless network information for a wireless network providing network service to the user device. Based on the first request, at step 804, a wireless network provider associated with the wireless network is identified and partner information associated with the wireless network provider is sent to the user device. At step 806, a second request to the wireless network provider to authenticate the user is sent, where the second request includes authentication information for the user from the first request. When the wireless network provider authenticates the user responsive to the second request, at step 808, an authorization token is received from the wireless network provider, where the authorization token enables the user device to access at least some of the media objects. At step 810, the authorization token is sent to the user device and a third request from the user device is received for subscription information associated with the authorization token, where the subscription information specifies access rights to at least some of the media objects, including a first media object. At step 812, the wireless network provider is queried for the subscription information, and the subscription information is sent to the user device, where the user device is enabled to use the subscription information to replay the first media object.

As disclosed herein, systems and methods are provided for a media provider to allow a user to access media objects with a third-party partner that authenticates the user and authorizes the user to access certain media objects. The media provider offers access to media objects, such as video content or audio content. The partner, through a relationship with the media provider, similarly offers access to the media provider's media objects, for example, as a service or benefit to the partner's customers or users. In particular, a partner integration server mediates user authentication and authorization by the partner. The partner integration server also allows the media provider to easily and flexibly to add and integrate additional partners.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A media partner integration system comprising:
a partner integration server;
a media access platform providing access to a media repository;
the media repository storing media objects;
wherein the partner integration server is enabled to receive a first request from a user of a user device to access the media objects, wherein the user device is enabled to provide, to the partner integration server, at least one filtration criteria associated with the user, the filtration criteria selected from at least one of: a geolocation identifier, a carrier network, a location coordinate, a network address, and a device type;
wherein, in response to the first request, the partner integration server is enabled to select a first partner server from a plurality of partner servers based on the filtration criteria, and upon selection of the first partner server, the partner integration server is further enabled to send a second request to authenticate and to authorize the user with at least one partner server.

2. The media partner integration system of claim 1, wherein:
the partner integration server is enabled to receive a selection of the first partner server from the user device.

3. The media partner integration system of claim 1, wherein the partner integration server is enabled to:
receive an authorization response to the second request from the first partner server, the authorization response including a partner subscription identifier; and
match the partner subscription identifier to a second subscription identifier associated with the media access platform.

4. The media partner integration system of claim 1, wherein the partner integration server is enabled to:
store configuration data respectively for each of the partner servers, including the first partner server, wherein the configuration data identifies an authentication protocol respectively associated with each of the partner servers; and
select a first authentication protocol associated with the first partner server.

5. The media partner integration system of claim 4, wherein the configuration data further comprises:
selection criteria for identifying the respective partner server;
a partner subscription identifier; and
a partner server identifier associated with the first authentication protocol; and
wherein the partner configuration server is enabled to:
receive requests from an administrative client to modify the configuration data.

6. The media partner integration system of claim 1, wherein the media objects comprise at least one of: audio objects, video objects, and text objects.

7. The media partner integration system of claim 6, wherein the media objects comprise at least one of:
media objects associated with a live event;
media objects associated with a past event; and
media objects associated with a sports event.

8. The media partner integration system of claim 1, wherein the first authentication protocol is selected from at least one of: a basic login protocol; a token-based authentication protocol; a two-factor authentication protocol; and a biometric authentication protocol.

9. A method of authenticating users for accessing media content, the method comprising:
receiving, from a media access client executing at a user device associated with a user, a first request at a partner integration server to access a media server providing access to media objects in a media repository;
responsive to the first request, identifying at least one partner, including a first partner, from a plurality of partners associated with the partner integration server, wherein each of the plurality of partners has been onboarded for operation with the partner integration server;
retrieving first partner information associated with the first partner, the first partner information indicative of an authentication method usable with the first partner to authenticate the user;
based on the first request, using the authentication method to authenticate the user;
when the authentication method successfully authenticates the user:
receiving an authorization token from the first partner, the authorization token usable by the media access client to access the media objects via the media server; and
forwarding the authorization token to the media access client.

10. The method of claim 9, further comprising:
prior to retrieving the first partner information, receiving, from the media access client, a selection of the first partner.

11. The method of claim 9, wherein the first request includes information associated with the user and indicative of at least one of: a geolocation of the user device; a carrier network for the user device; a brand or model of the user device; a location coordinate of the user device, and a network address associated with the first partner.

12. The method of claim 9, further comprising:
based on the first partner information, sending configuration information to the user device, the configuration information enabled for configuring a user interface displayed on the user device.

13. The method of claim 9, wherein the user device is a mobile device.

14. The method of claim 9, wherein the user device is enabled for wireless networking and is enabled for telephone service.

15. The method of claim 9, further comprising:
receiving a subscription query from the media access client, the subscription query including the authorization token;
forwarding the subscription query to the first partner;
responsive to the subscription query to the first partner, receiving subscription information from the first partner, the subscription information specifying access rights to the media objects provided to the user; and
forwarding the subscription information to the media access client, wherein the media access client is authorized to access the media objects specified by the subscription information.

16. The method of claim 9, further comprising:
accessing the first partner information usable to onboard the first partner for operation with the partner integration server, including modifying at least some of the first partner information; and
storing the first partner information in an administrative repository accessible to the partner integration server.

17. The method of claim 9, wherein the first partner information specifies at least one of:
filtration criteria for identifying the first partner using the first request;
a type of partner selected from session partner, transaction partner, and discount partner;
an authentication method for authenticating the user;
an internal subscription or an external subscription to the media objects; and
configuration information for the media access client when the first partner is identified.

18. A server for use in a media network, the server comprising:
a processor;
memory media accessible to the processor storing instructions executable by the processor,
wherein the media network includes a media server that provides access to media objects stored in a media repository, and wherein the instructions comprise instructions for:
receiving a first request from a user device operated by a user, wherein the first request is for access to the media network and the first request includes wireless network information for a wireless network providing network service to the user device;
based on the first request, identifying a wireless network provider associated with the wireless network;
sending partner information associated with the wireless network provider to the user device;
sending a second request from the media server to the wireless network provider to authenticate the user, wherein the second request includes authentication information for the user from the first request;
when the wireless network provider authenticates the user responsive to the second request, and provides an authorization token from the wireless network provider to the media server, wherein the authorization token enables the user device to access at least some of the media objects;
sending the authorization token from the media server to the user device;
receiving a third request from the user device for subscription information associated with the authorization token, wherein the subscription information specifies access rights to at least some of the media objects, including a first media object;
querying the wireless network provider for the subscription information; and
sending the subscription information to the user device, wherein the user device is enabled to use the subscription information to replay the first media object.

19. The server of claim 18, further comprising instructions for:
responsive to receiving the subscription information, storing the subscription information.

20. The server of claim 19, wherein storing the subscription information further comprises instructions for:
storing the subscription information at an admin repository accessible to the server, wherein the subscription information is indexed to the user.

21. The server of claim 20, wherein sending the second request to the wireless network provider further comprises:
selecting an authentication method associated with the second request, wherein the authentication method is specified in partner information for the first partner.

22. The server of claim 21, wherein the authentication method is selected from at least one of:
no login method; a basic login method; a token authentication method; a two-factor authentication (2FA) method; and a biometric authentication method.

23. The server of claim 18, further comprising instructions for:
receiving partner information for a second wireless network provider that is not onboarded for operation with the server in the media network; and
using the partner information for the second wireless network provider, configuring the server to register the second wireless network provider with server, wherein the second wireless network provider is available to the server for identifying customer relationships with users.

24. The server of claim 23, wherein receiving the partner information for the second wireless network provider further comprises instructions for:
receiving the partner information via an administrative client associated with the server, wherein the administrative client is enabled to store the partner information to configure the second wireless network provider to operate with the server for authenticating users.

25. The server of claim 23, wherein the server stores the partner information at an admin repository accessible to the server, wherein the partner information is indexed to the second wireless network provider and corresponds to a partner protocol for authentication by the second wireless network provider.

* * * * *